United States Patent
Matsui et al.

(10) Patent No.: US 7,012,765 B2
(45) Date of Patent: Mar. 14, 2006

(54) IMAGE PICKUP LENS AND IMAGE PICKUP DEVICE

(75) Inventors: Takumi Matsui, Hachioji (JP); Eigo Sano, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/984,830

(22) Filed: Nov. 10, 2004

(65) Prior Publication Data

US 2005/0105194 A1    May 19, 2005

(30) Foreign Application Priority Data

Nov. 13, 2003  (JP) ............................ 2003-383261
Feb. 25, 2004  (JP) ............................ 2004-049508

(51) Int. Cl.
*G02B 9/34* (2006.01)

(52) U.S. Cl. ................. 359/771; 359/773; 359/774
(58) Field of Classification Search ................ 359/738, 359/754, 771, 772, 773, 774
See application file for complete search history.

(56) References Cited

U.S. PATENT DOCUMENTS

| 3,915,559 | A |  | 10/1975 | Fleischman | |
| 4,792,216 | A | * | 12/1988 | Kudo | 359/715 |
| 5,745,307 | A |  | 4/1998 | Kouthoofd et al. | |
| 5,862,000 | A | * | 1/1999 | Takahashi et al. | 359/773 |
| 6,476,982 | B1 | * | 11/2002 | Kawakami | 359/791 |
| 2003/0161051 | A1 | * | 8/2003 | Sato | 359/772 |
| 2003/0161054 | A1 | * | 8/2003 | Sato | 359/793 |

FOREIGN PATENT DOCUMENTS

| JP | 2002 365529 | 12/2002 |
| JP | 2002 365531 | 12/2002 |

* cited by examiner

*Primary Examiner*—Hung Xuan Dang
*Assistant Examiner*—Joseph Martinez
(74) *Attorney, Agent, or Firm*—Finnegan, Henderson, Farabow, Garrett & Dunner, L.L.P.

(57) ABSTRACT

An image pickup lens includes: a first lens which is a positive lens having a positive refractive power; a second lens which is a negative lens having a negative refractive power; a third lens which is a positive lens; a fourth lens having at least one surface with an aspherical shape, wherein the first lens, the second lens, the third lens and the fourth lens are arranged from an object side of the image pickup lens in this order and the image pickup lens is designed using a predefined condition.

18 Claims, 19 Drawing Sheets

EXAMPLE 1

EXAMPLE 1

EXAMPLE 1

SPHERICAL ABERRATION

ASTIGMATISM

DISTORTION ABERRATION

COMA (M)

EXAMPLE 2

EXAMPLE 2
FIG. 4 (a)
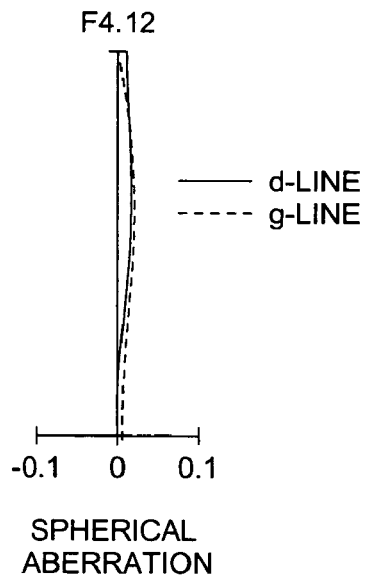
SPHERICAL ABERRATION
FIG. 4 (b)
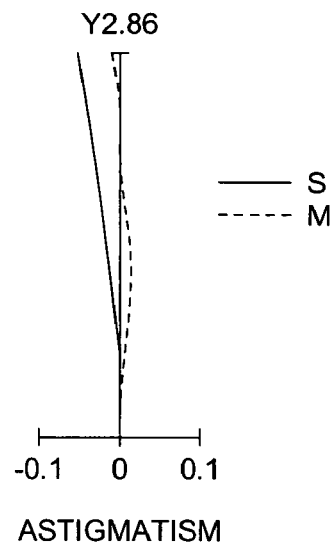
ASTIGMATISM
FIG. 4 (c)
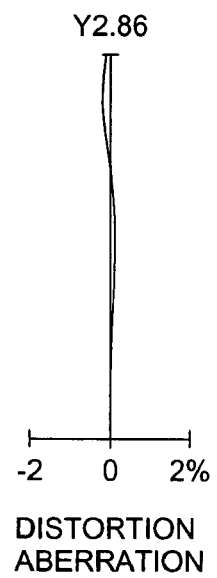
DISTORTION ABERRATION
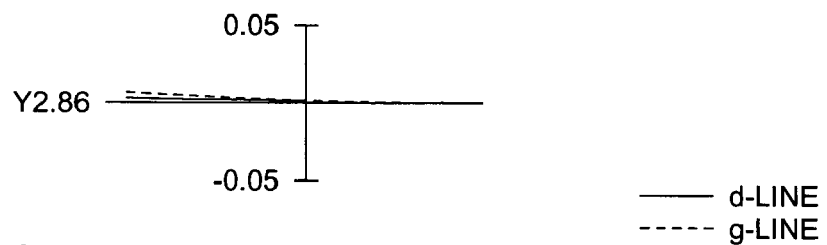
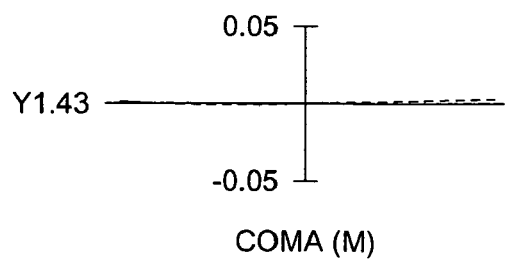
FIG. 4 (d)
COMA (M)

EXAMPLE 3

EXAMPLE 3
FIG. 6(a)
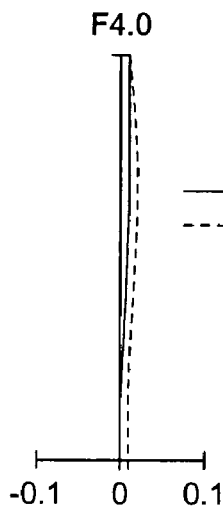
SPHERICAL ABERRATION
FIG. 6(b)
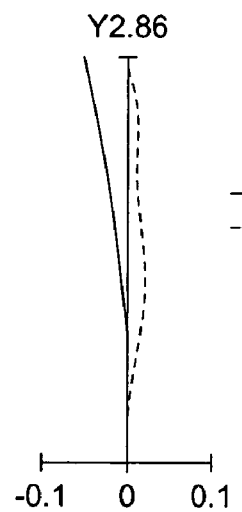
ASTIGMATISM
FIG. 6(c)
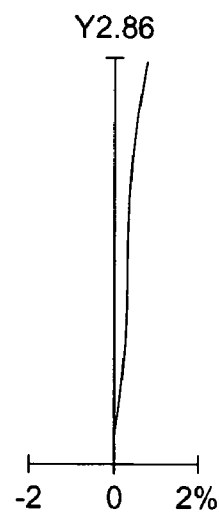
DISTORTION ABERRATION
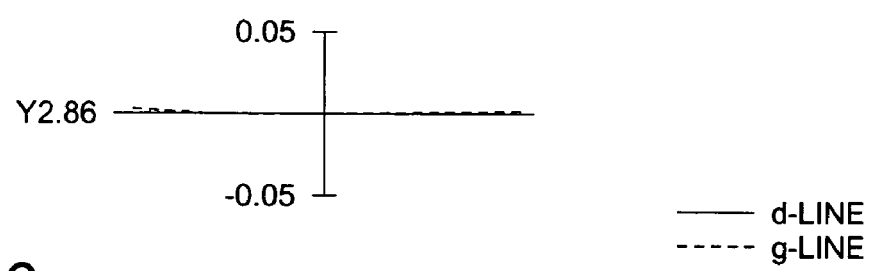
FIG. 6(d)
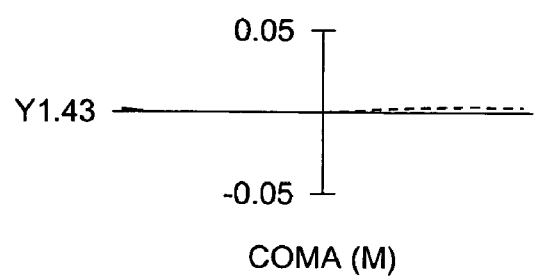
COMA (M)

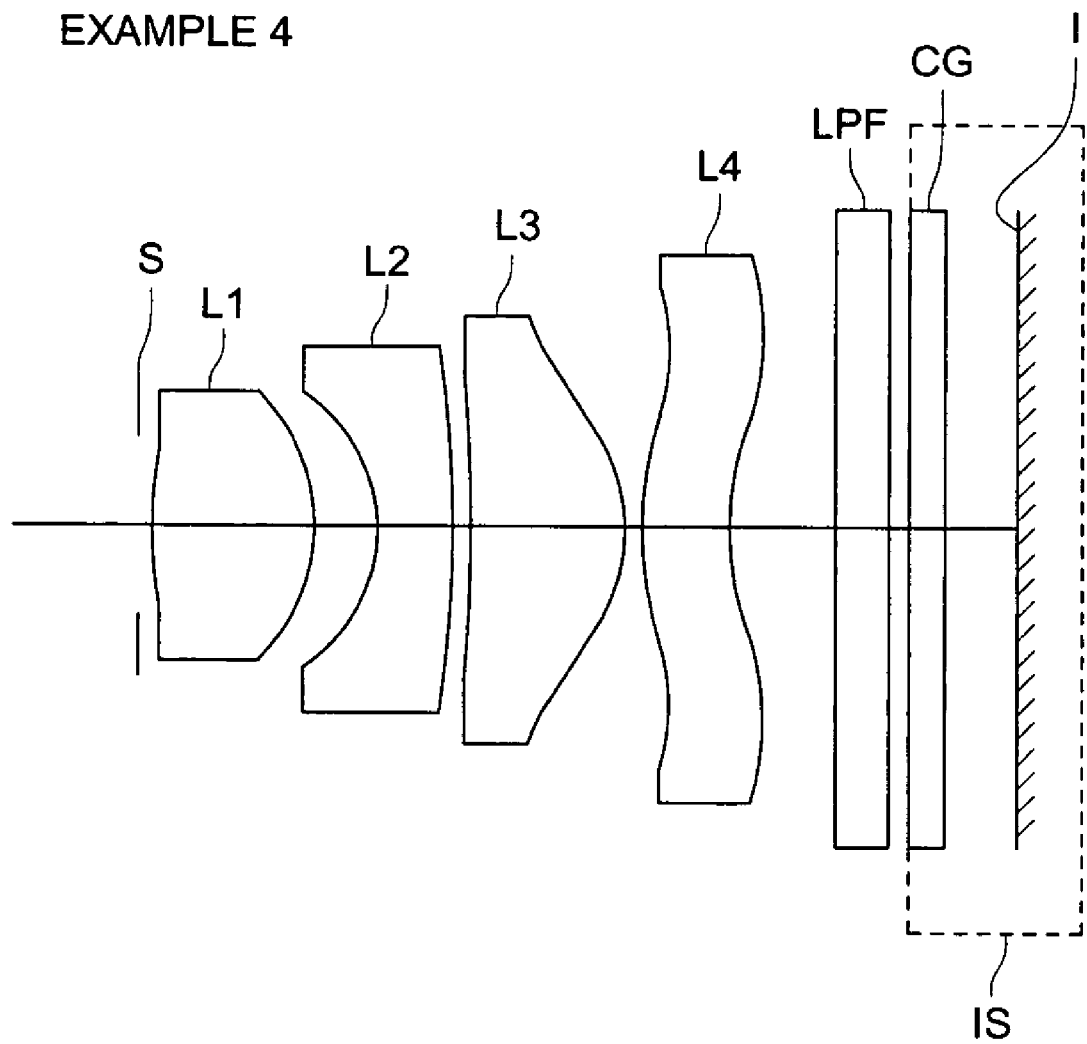

EXAMPLE 4
FIG. 8(a)    FIG. 8(b)    FIG. 8(c)
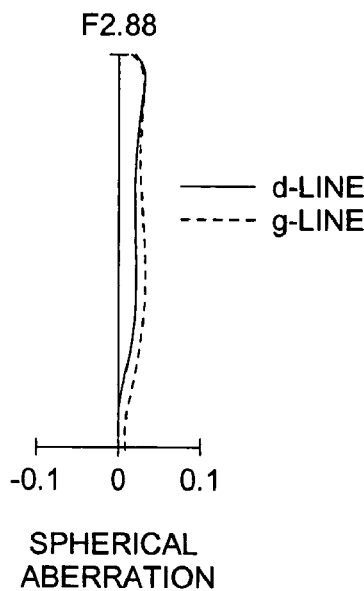
SPHERICAL ABERRATION
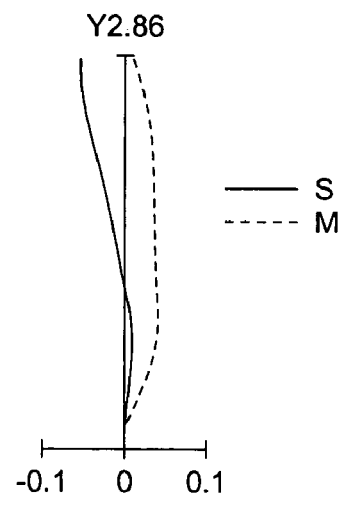
ASTIGMATISM
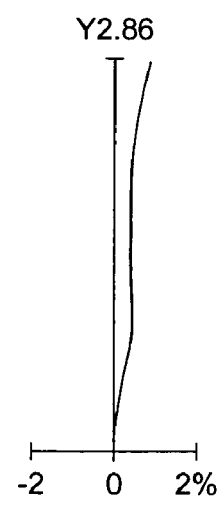
DISTORTION ABERRATION
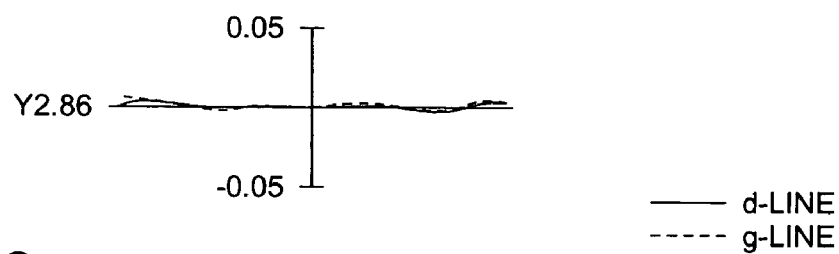
FIG. 8(d)
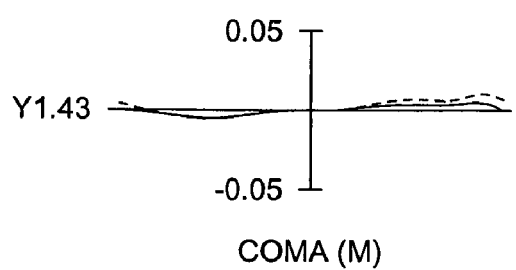
COMA (M)

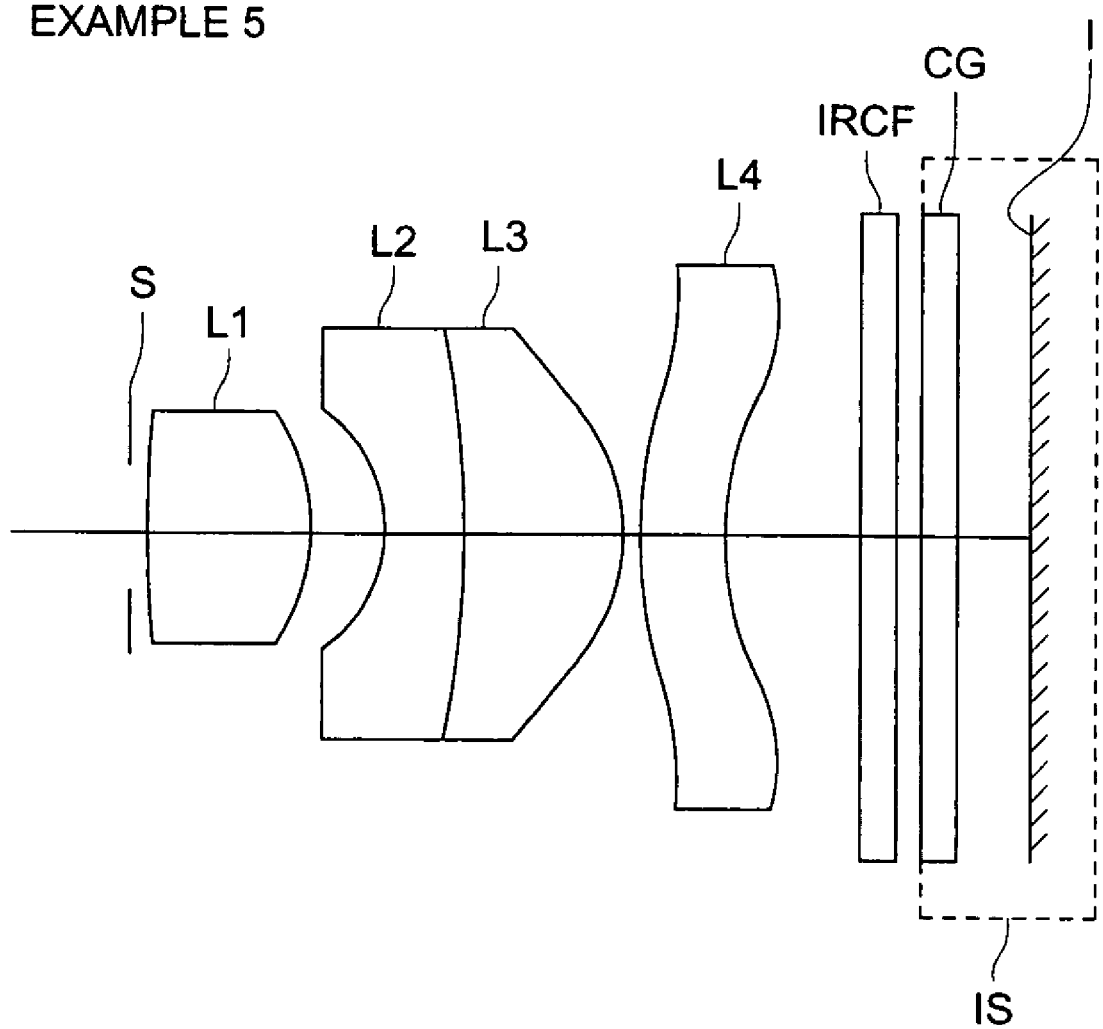

EXAMPLE 5

SPHERICAL ABERRATION
ASTIGMATISM
DISTORTION ABERRATION
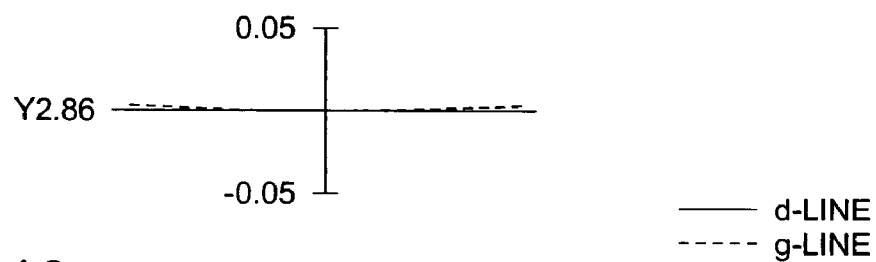
FIG. 10 (d)
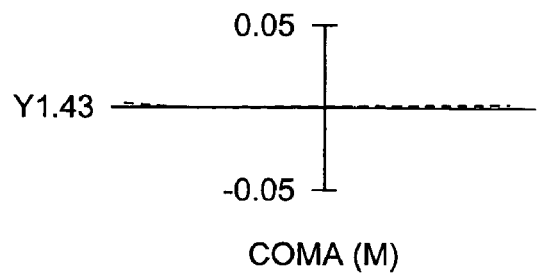
COMA (M)

FIG. 12 (a)   FIG. 12 (b)   FIG. 12 (c)
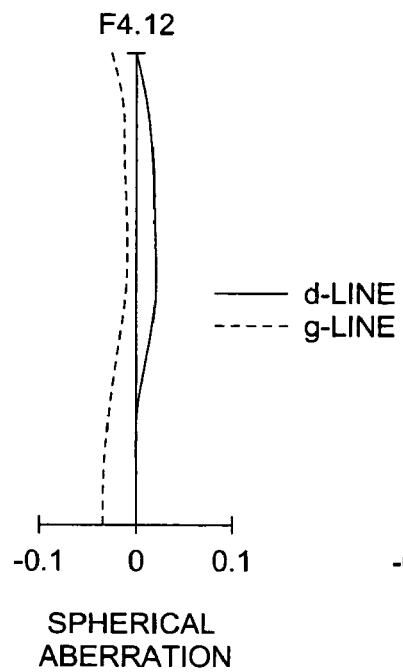
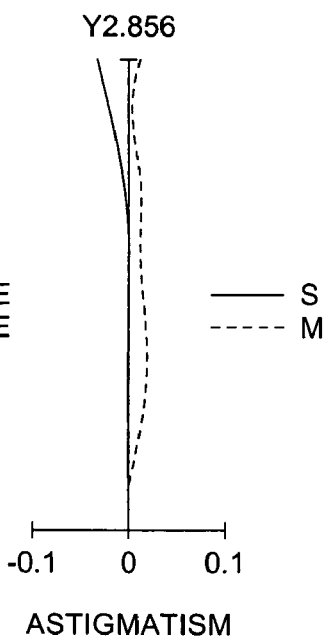
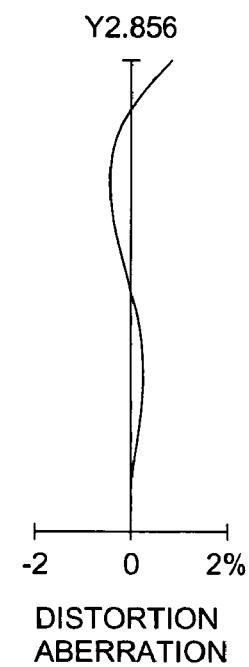
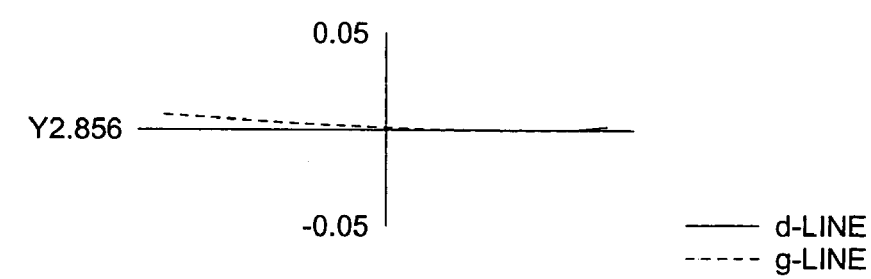
FIG. 12 (d)
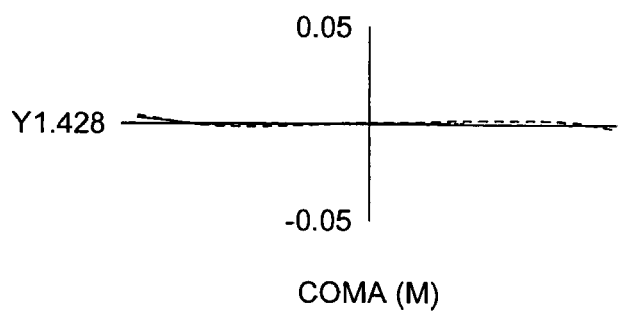

FIG. 14 (a)
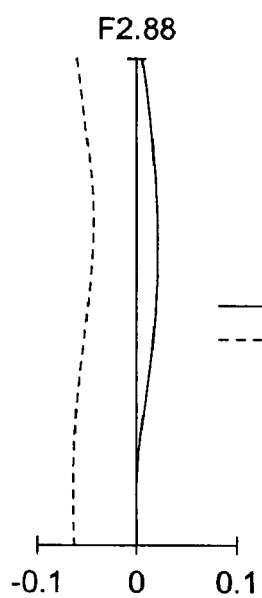
SPHERICAL ABERRATION
FIG. 14 (b)
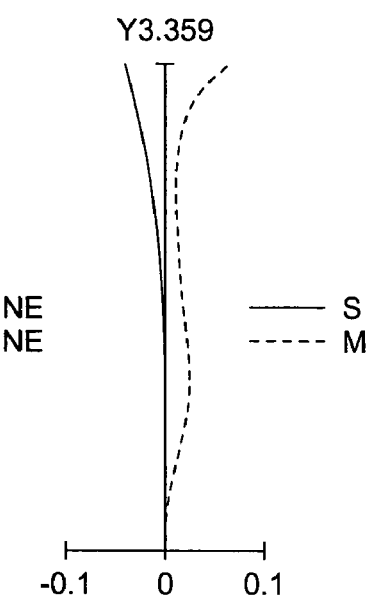
ASTIGMATISM
FIG. 14 (c)
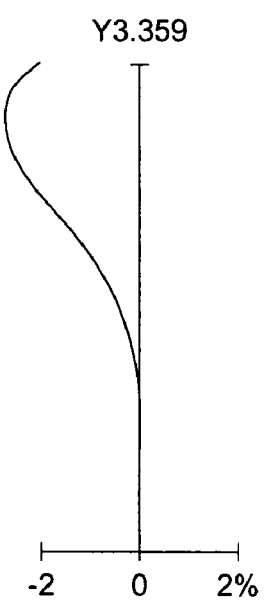
DISTORTION ABERRATION
FIG. 14 (d)
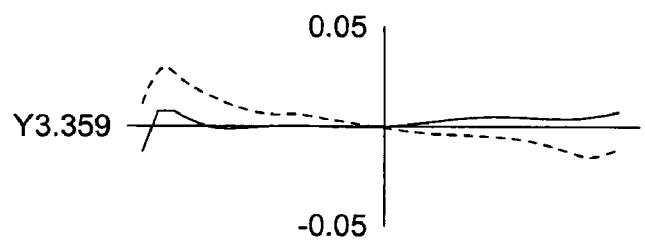
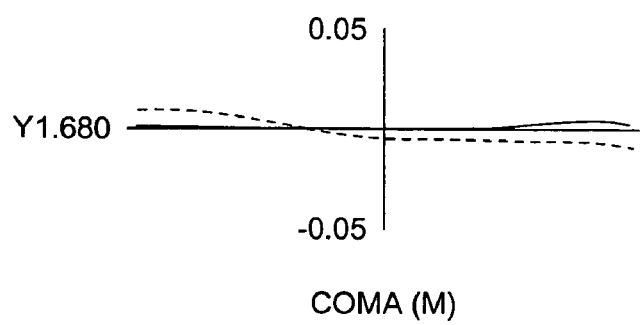
COMA (M)

FIG. 16(a)
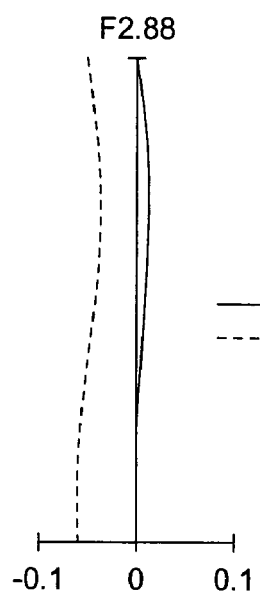
SPHERICAL ABERRATION
FIG. 16(b)
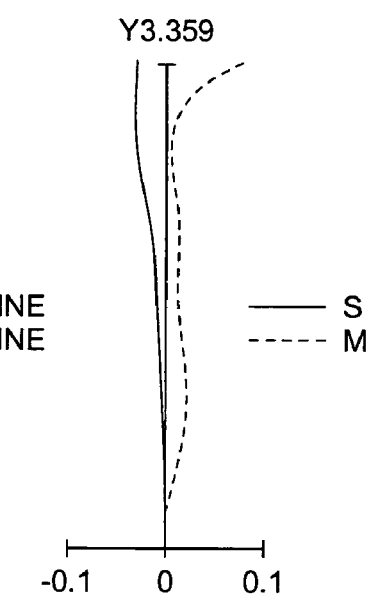
ASTIGMATISM
FIG. 16(c)
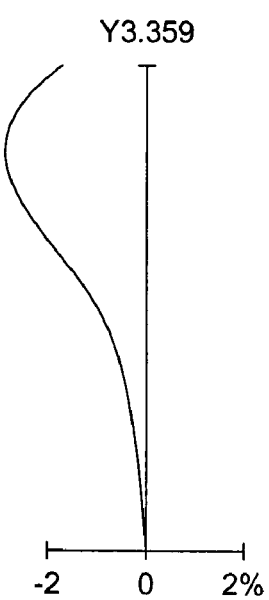
DISTORTION ABERRATION
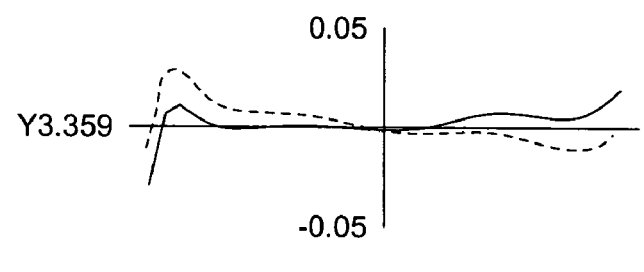
FIG. 16(d)
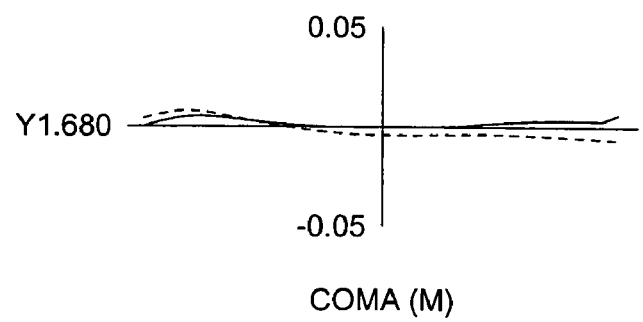
COMA (M)

EXAMPLE 9

FIG. 19(a) FIG. 19(b) FIG. 19(c)
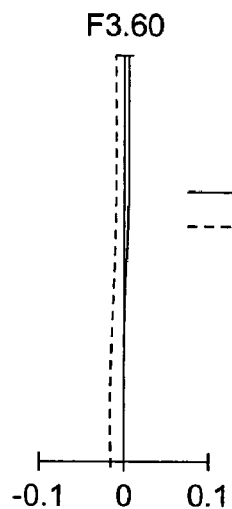
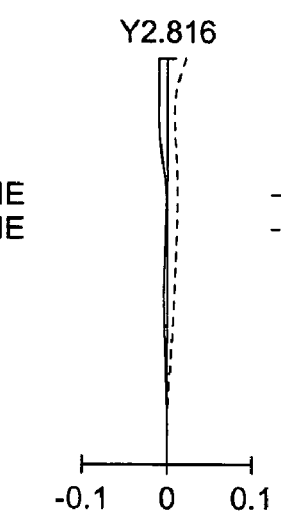
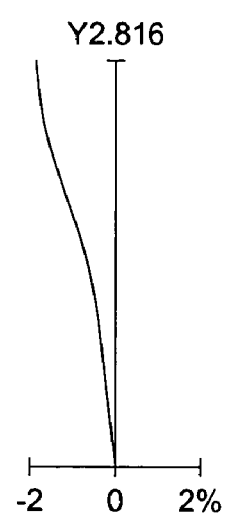
SPHERICAL ABERRATION    ASTIGMATISM    DISTORTION ABERRATION
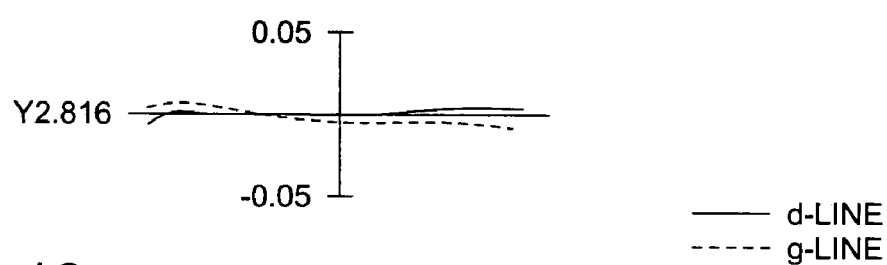
FIG. 19(d)
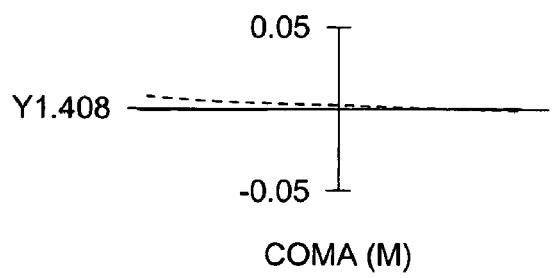
COMA (M)

IMAGE PICKUP LENS AND IMAGE PICKUP DEVICE

FIELD OF THE INVENTION

The present invention relates to an image pickup lens of an image pickup device using a solid image pick element such as a CCD (Charge Coupled Device) type image sensor or a CMOS (Complementary Metal-Oxide Semiconductor) type image sensor, and an image pickup device using it.

BACKGROUND OF THE INVENTION

A digital still camera or digital video camera on which the image pickup device using the solid image pickup element such as the CCD type image sensor or CMOS type image sensor is mounted, is developed. Further, because the image pickup device using these solid image pickup elements is appropriate for the down-sizing, recently, they are also mounted on small sized information terminals including a movile phone. Following a further down sizing and high pixelation of the solid image pickup element, the requirement for the down sizing and for making the high performance also in image pickup lenses mounted on these image pickup devices is increasing.

As an image pickup lens for such a purpose, because the higher performance can be obtained comparing to the lens of 2-lens composition or 3-lens composition, the lens of 4-group 4-lens composition includes, in order from the object side, an aperture stop, the first lens having a positive refractive power, the second lens having a negative refractive power, the third lens having a positive refractive power, and the fourth lens having a positive or negative refractive power, is well known. Among them, particularly a lens having a short lens-total length (a distance on the optical axis from the aperture stop to the image side focal point) is disclosed, for example, in Patent Document 1.

(Patent Document 1) Tokkai No. 2002-365529

Hereupon, the image pickup lens of a type written in Patent Document 1 has a so-called telephoto type power arrangement in which the first lens is a positive lens, the second lens is a negative lens, the third lens is a positive lens, and the fourth lens is a negative lens, and is a type in which a size reduction of the image pickup lens is tried thereby. However, on the one hand, in the image pickup lens of the Patent Document 1, there are defects in which the aberration correction is insufficient for the correspondence to the high pixelation of the solid image pickup element, or the wide angle-formation of the photographic image angle.

In view of such problems, the present invention is made, and an object of the present invention is to provide an image pickup lens of 4-group 4-lens composition which is small sized, and by which the higher image formation performance can be obtained, and which is appropriate for the wide angle-formation, and has a good image side telecentricity, and an image pickup device using it.

The image pickup lens according to the present invention includes, in order from the object side, a lens having a positive refractive power (hereinafter, a positive lens), a lens having a negative refractive power (hereinafter, a negative lens), a positive lens, and a lens at least whose one surface is an aspheric surface shape. This composition is a power arrangement called a so-called triplet, and when designed so as to satisfy a predetermined condition, the spherical aberration, coma, and chromatic aberration in these lenses can be appropriately corrected. Further, when the forth lens of an aspheric surface shape is arranged, the aberrations out of axis including the distortion aberration can be corrected, and further a good image side telecentricity can be obtained.

BRIEF DESCRIPTION OF THE DRAWINGS

FIGS. 4(a)–4(d) are aberration views (spherical aberration 4(a), astigmatism 4(b), distortion aberration 4(c), meridional coma 4(d)) of Example 2.

FIGS. 6(a)–6(d) are aberration views (spherical aberration 6(a), astigmatism 6(b), distortion aberration 6(c), meridional coma 6(d)) of Example 3.

FIG. 7 is an optical axis direction sectional view of an image pickup device including an image pickup lens of Example 4.

FIGS. 8(a)–8(d) are aberration views (spherical aberration 8(a), astigmatism 8(b), distortion aberration 8(c), meridional coma 8(d)) of Example 4.

FIG. 9 is an optical axis direction sectional view of an image pickup device including an image pickup lens of Example 5.

FIGS. 12(a)–12(d) are aberration views (spherical aberration 12(a), astigmatism 12(b), distortion aberration 12(c), meridional coma 12(d)) of Example 6.

FIGS. 14(a)–14(d) are aberration views (spherical aberration 14(a), astigmatism 14(b), distortion aberration 14(c), meridional coma 14(d)) of Example 7.

FIGS. 16(a)–16(d) are aberration views (spherical aberration 16(a), astigmatism 16(b), distortion aberration 16(c), meridional coma 16(d)) of Example 8.

FIGS. 19(a)–19(d) are aberration views (spherical aberration 19(a), astigmatism 19(b), distortion aberration 19(c), meridional coma 19(d)) of Example 9.

DETAILED DESCRIPTION OF THE PREFERRED EMBODIMENT

Figure 1:
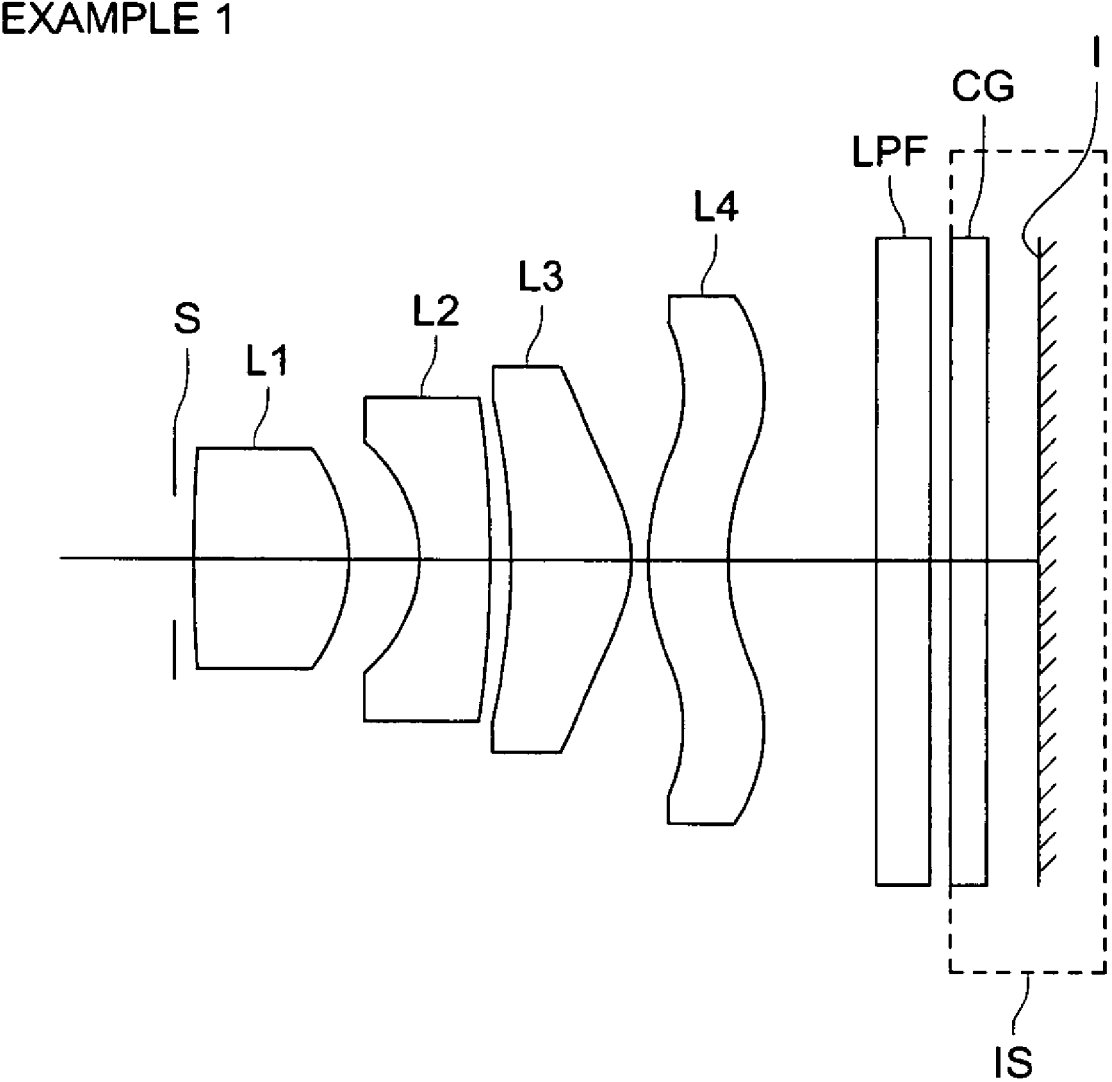
FIG. 1 is an optical axis direction sectional view of an image pickup device including an image pickup lens of Example 1.
Figure 2A:
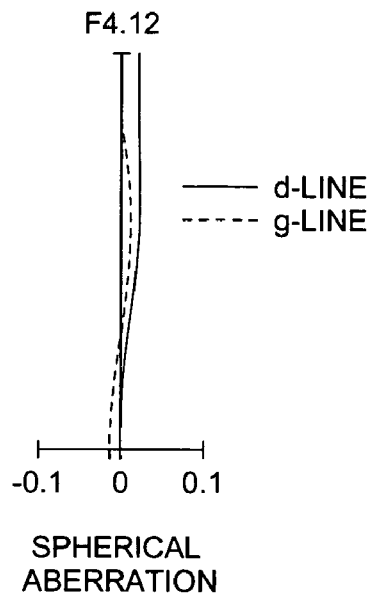
FIGS. 2(a)–2(d) are aberration views (spherical aberration 2(a), astigmatism 2(b), distortion aberration 2(c), meridional coma 2(d)) of Example 1.
Figure 2B:
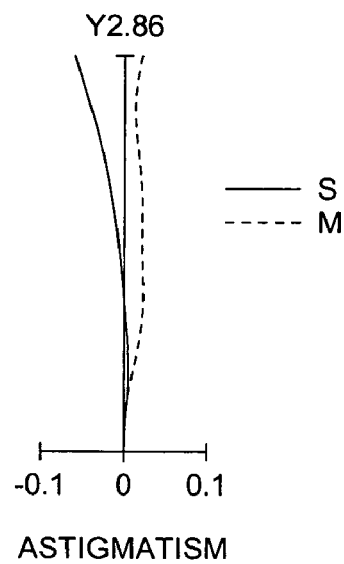
Figure 2C:
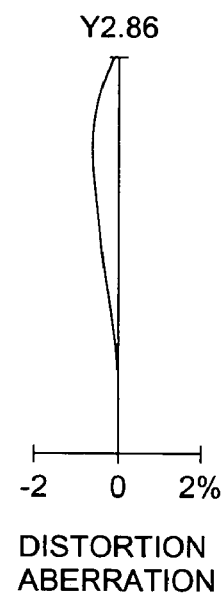
Figure 2D:
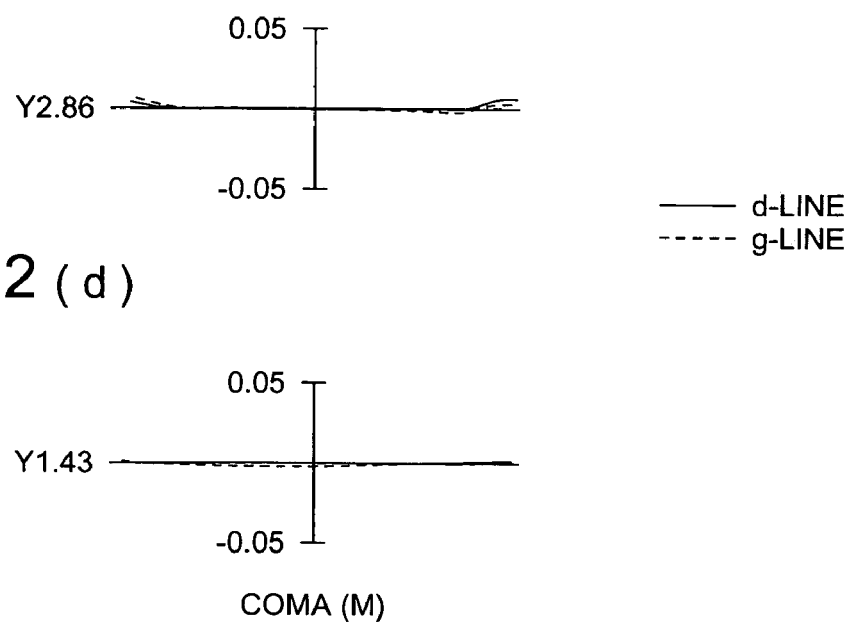

Preferable structures of the present invention will be described below.

An image pickup lens written in item 1 includes, in order from the object side, the first lens which is a lens, the second lens which is a negative lens, the third lens which is a positive lens, and the fourth lens at least one surface of which is an aspheric surface shape, and satisfies the following conditional expressions.

$$-3.0 < (r3+r4)/(r3-r4) < -0.7 \quad (1)$$

$$v1-v2 > 15.0 \quad (2)$$

$$v3-v2 > 15.0 \quad (3)$$

Where, r3 is a radius of curvature of an object side surface of the second lens, r4 is a radius of curvature of an image side surface of the second lens, v1 is Abbe constant of the first lens, v2 is Abbe constant of the second lens, and v3 is Abbe constant of the third lens.

A basic structure of the present invention for obtaining an image pickup lens which is small sized, and whose aberration is finely corrected, includes, in order from the object side, the first lens which is a positive lens, the second lens which is a negative lens, the third lens which is a positive lens, and the fourth lens, and satisfies the above conditional expressions (1)–(3).

A composition provides, in order from the object side, a positive lens, negative lens, and positive lens, is a power arrangement called a so-called triplet type, and in a composition from the first lens to the third lens, the spherical aberration, coma, and chromatic aberration can be adequately corrected. Further, by the aspheric surface shape fourth lens, aberrations out of axis including the distortion aberration are corrected, and further, a good image side telecentricity can be obtained.

The conditional expression (1) is a condition by which the shape of the second lens is adequately set. Within a range of the conditional expression, in the second lens, the object side surface becomes a shape having a strong negative refractive power. When a value shown in the conditional expression (1) is under the upper limit value, a negative refractive power of the object side surface of the second lens can be strengthened, and there is an effect for a correction of the spherical aberration, coma, image surface distortion, astigmatism, and chromatic aberration. On the one hand, the radius of curvature of the image side surface of the second lens becomes gentle, and the aberration of the light flux out of axis passing through the vicinity of the peripheral edge of this surface can be suppressed. Further, because a main point position of the second lens comes near the object side, thereby, the position of the exit pupil of the image pickup lens can be positioned farther from the image formation surface, and accordingly, a good image side telecentricity can be obtained. In contrast to this, when a value shown in the conditional expression (1) is over than the lower limit value, the radius of curvature of the object side surface of the second lens is not too small, and becomes a shape in which there is no problem in the lens processing.

The conditional expression (2) and the conditional expression (3) are conditions to adequately set Abbe constants of the first lens to the third lens. When the conditions shown here are satisfied, the chromatic aberration generated in the first lens and the third lens having the positive refractive power can be adequately corrected by the second lens having the negative refractive power.

The image pickup lens written in item 2 has, in the structure written in item 1, an aperture stop on the most object side. Because it has an aperture stop at a closest position to an object side of the optical pickup lens, the distance from the image formation surface to the exit pupil position of the image pickup lens can be lengthened, and a good image side telecentricity can be obtained.

The image pickup lens written in item 3, in the structure written in item 2, satisfies the following conditional expression.

$$-1.5 < (r3+r4)/(r3-r4) < -0.7 \quad (4)$$

Where, r3 is a radius of curvature of an object side surface of the second lens, r4 is a radius of curvature of an image side surface of the second lens.

The conditional expression (4) is a condition for adequately setting the shape of the second lens. When a value shown in the conditional expression (4) is under the upper limit value of the expression, the second lens becomes a meniscus shape in which the concave surface is faced to the object side, or a flat-concave shape, and in the light flux on axis, the spherical aberration, and the chromatic aberration can be corrected, further, on the one hand, in the light flux out of axis, the generation of coma can be suppressed. Further, when the curvature of the image side surface of the second lens and that of the object side surface of the third lens are made comparatively near, and both surfaces are arranged in close vicinity to each other, it is preferable because the chromatic aberrations on axis and out of axis, are effectively corrected. Further, because the main point position of the second lens comes closer to the object side, thereby, the exit pupil position of the image pickup lens can be positioned farther from the image formation surface, accordingly, a better image side telecentricity can be obtained. Further, because the negative power in the entire image pickup lens is arranged on a comparatively object side, it becomes a structure by which a wide photographic image angle can be easily secured, further, a sufficient back-focus can be easily secured. In contrast to this, when a value shown in the conditional expression (4) exceeds the lower limit value of the expression, because the radius of curvature of the object side surface of the second lens does not become small so much. Following that, it can be suppressed that the radius of curvature of the image side surface of the first lens also becomes small too much, and the performance deterioration of the image side surface of the first lens by the production error can be suppressed small.

The image pickup lens written in item 4, in the structure written in item 2 or 3, satisfies the following conditional expression.

$$-1.5 < (r3+r4)/(r3-r4) < -1.0 \quad (5)$$

Where, r3 is a radius of curvature of an object side surface of the second lens, and r4 is a radius of curvature of an image side surface of the second lens.

The conditional expression (5) is a condition for further adequately setting the shape of the second lens. When a value shown in the conditional expression (5) is lower than the upper limit value of the expression, the second lens becomes a meniscus shape whose concave surface faces the object side, or a flat-concave shape, and in the light flux on axis, the spherical aberration and the chromatic aberration can be more effectively corrected. Further, on the one hand, in the light flux out of axis, the generation of coma can be more effectively suppressed. Further, when the radius of curvature of the image side surface of the second lens and that of the object side surface of the third lens are made comparatively near, and both surfaces are arranged in close vicinity to each other, it is preferable because the chromatic aberrations on axis and out of axis can be more effectively corrected. Further, because the main point position of the second lens comes closer to the object side, thereby, the exit pupil position of the image pickup lens can be positioned farther from the image formation surface, accordingly, the better image side telecentricity can be obtained. Further, because the negative power in the entire image pickup lens is arranged on comparatively object side, it becomes a structure by which the wide photographic angle can be easily, more effectively secured, and other than that, a sufficient back-focus can be more easily secured. In contrast to this, when a value shown in the conditional expression (5) is over the lower limit value, the radius of curvature of the object side surface of the second lens is not too small. Following that, it can be effectively suppressed that the curvature of the image side surface of the first lens also is too small, and the performance deterioration of the image side surface of the first lens by the production error can be suppressed small.

The image pickup lens written in item 5, in the structure written in any one of items 2–4, satisfies the following conditional expression.

$$0.1 < (r1+r2)/(r1-r2) < 1.0 \tag{6}$$

Where, r1 is a radius of curvature of an object side surface of the first lens, r2 is a radius of curvature of an image side surface of the first lens.

The conditional expression (6) is a condition for adequately setting the shape of the first lens. In a range shown in the conditional expression (6), the image side surface has a stronger refractive power than the object side surface. When the conditional expression (6) is satisfied, the strong refractive power is not given too much to the object side surface of the first lens, and the generation of the coma on this surface can be suppressed. Further, the main point position of the first lens comes near the image side. Thereby, the exit pupil position of the photographic lens can be positioned farther from the image formation surface, and accordingly, a good image side telecentricity can be obtained. Further, when the object side surface of the first lens in closest vicinity to the aperture stop is made an aspheric surface shape, it is effective for a purpose in which the spherical aberration, and the coma in the entire image pickup lens are corrected with a good balance.

As for the image pickup lens written in item 6, in the structure written in any one of items 2–5, the fourth lens includes a positive lens.

When the fourth lens is a positive lens, the distance from the front side main point position to the aperture stop is increased. Thereby, the exit pupil position of the photographic lens can be positioned farther from the image formation surface, and accordingly, a good image side telecentricity can be obtained. Further, it is preferable because the back-focus for arranging a cover glass of CCD, infrared absorption filter, or optical low-pass filter can be sufficiently secured.

As for the image pickup lens written in item 7, in the structure written in any one of items 2–5, the fourth lens includes a negative lens.

When the fourth lens is a negative lens, the total length of the image pickup lens can be suppressed short. Further, in this case, it is preferable for keeping the image side telecentricity in the high image angle good, that the image side surface of the fourth lens is the aspheric surface shape.

The image pickup lens written in item 8, in the structure written in item 1, has an aperture stop between the first lens and the second lens. When it has the aperture stop between the first lens and the second lens, even when a mechanical shutter or a member attendant to the aperture stop such as a light transmission rate change member such as an ND filter is mounted, because those members can be arranged between the first lens and the second lens, the total length (length in the optical axis direction) of the entire image pickup device using such an image pickup lens can be reduced.

As for the image pickup lens written in item 9, in the structure written in item 8, the first lens has the shape having a convex surface which faces the object side.

Figure 17:
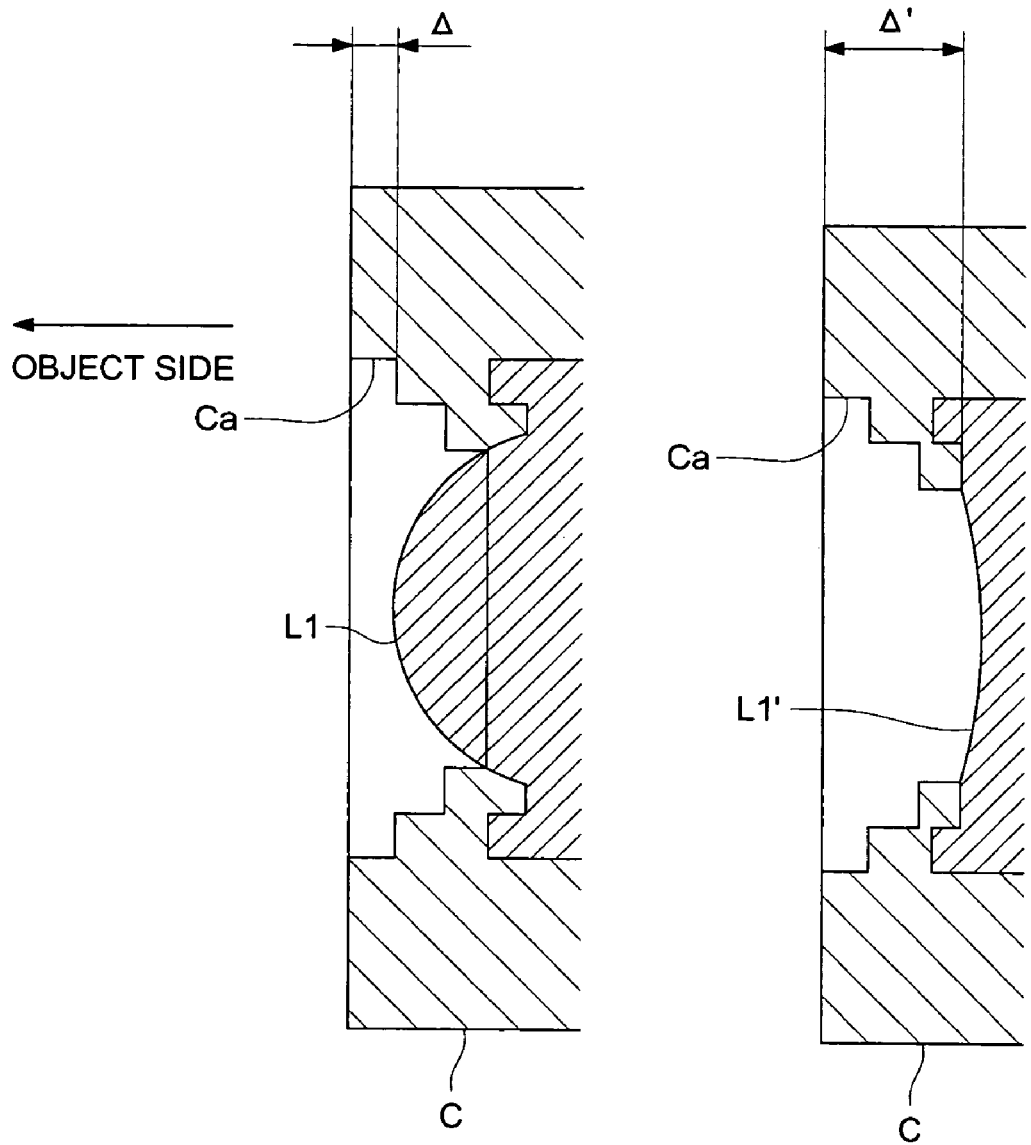
FIGS. 17(a) and 17(b) are sectional views showing examples of the first lens attached to a light shielding member of an image pickup device together with the light shielding member.

FIGS. 17(a) and 17(b) are sectional views of an example showing the first lens attached to a light shielding member of the image pickup device together with the light shielding member. In FIG. 17(a), the first lens L1 has the shape whose convex surface faces the object side, and in FIG. 17(b), the first lens L1' has the shape whose concave surface faces the object side. Herein, when the distances from positions closest to the image sides of the first lens L1 and L1', to the position closest to the image side of the light shielding member C are made respectively Δ and Δ', FIG. 17(a) clearly shows Δ<Δ'. This is for the reason that, as shown in FIG. 17(a), when the convex surface of the first lens L1 faces the object side, a part of the first lens L1 enters into a space in the step-like aperture Ca of the light shielding member C, thereby, the effective use of the space can be intended. When such a structure is applied, the length in the optical axis direction of the image pickup device in which such an image pickup lens is assembled, can be suppressed, and the compact structure can be realized.

The image pickup lens written in item 10, in the structure written in item 8 or 9, satisfies the following conditional expression.

$$-1.5 < f2/f < -0.7 \tag{7}$$

Where, f2 is a focal length of the second lens, f is a focal length of the entire image pickup lens system.

The conditional expression (7) is an expression for optimizing the focal length of the second lens under conditions of the conditional expressions (1), (2) and (3). When a value of the conditional expression (7) is lower than the upper limit, a negative refractive power of the second lens is not too strong, and a good image side telecentricity can be obtained. Further, when it is larger than the lower limit, the negative refractive power of the second lens can be adequately kept, and the chromatic aberration on axis can be finely corrected.

As for the image pickup lens written in item 11, in the structure written in any one of items 8–10, the first lens and the second lens in the image pickup lens have respectively meniscus shapes such that the aperture stop is arranged between the first lens and the second lens and the concave surfaces of the first lens and the second lens face the aperture stop. When such a structure is applied, it becomes a structure by which aberrations out of axis such as the magnification chromatic aberration or distortion aberration can be easily corrected.

The image pickup lens written in item 12, in the structure written in any one of items 8–11, satisfies the following conditional expression.

$$-2.5 < (r3+r4)/(r3-r4) < -1.2 \tag{8}$$

The conditional expression (8) is a condition under which the shape of the second lens is adequately set. When a value shown in the conditional expression (8) is lower than the upper limit value, the second lens becomes a meniscus shape whose concave surface faces the object side. Therefore, in the light flux on axis, the spherical aberration and the chromatic aberration can be corrected, further, on the one hand, in the light flux out of axis, the generation of the coma can be suppressed. Further, when the radius of curvature of the image side surface of the second lens and that of the object side surface of the third lens are made comparatively close to each other, and both surfaces are arranged in close vicinity of each other, because the chromatic aberrations on axis and out of axis can be effectively corrected, it is preferable. Further, because the main point position of the second lens is closer to the object side, hereby, the exit pupil position of the image pickup lens can be positioned farther from the image formation surface, accordingly, a better image side telecentricity can be obtained. Further, because the negative power in the entire image pickup lens is positioned on comparatively object side, it becomes a structure by which a wide photographic image angle can be easily secured, and a sufficient back-focus can be easily secured. In contrast to this, when a value shown in the conditional expression (8) is larger than the lower limit value of the expression, it can be made a structure in which the radius of curvature of the object side surface of the second lens is not too small, and the magnification chromatic aberration or distortion aberration can be more easily corrected. Hereupon, because the first lens and the second lens are a symmetrical shape with the aperture stop between them, the ray out of axis incident on the object side surface of the second lens can be made incident at an angle near the normal line of the surface. Even when, comparing to the image pickup lens having the aperture stop on the most object side, the second lens is a strong meniscus shape, the aberration can be finely corrected.

As for the image pickup lens written in item 13, in the structure written in any one of items 8–12, the fourth lens is a negative lens.

When the fourth lens is a negative lens, the total length of the image pickup lens can be suppressed short. Further, in this case, it is preferable that the image side surface of the fourth lens is an aspheric surface shape, for keeping the image side telecentricity at the high image angle good.

As for the image pickup lens written in item 14, in the structure written in any one of items 1–13, an air lens formed by the image side surface of the third lens and the object side surface of the fourth lens in the image pickup lens has the biconcave shape. When the air lens between the third lens and the fourth lens is the biconcave shape, by its positive refractive power, when such an image pickup lens is used for the image pickup device, the telecentricity of the light flux image-formed on the peripheral portion of the image pickup surface of its solid image pickup element can be easily secured.

In the structure written in any one of items 1–14, the image pickup lens written in item 15 satisfies the following conditional expressions.

$$0.30 < fa/f < 0.60 \quad (9)$$

$$0.30 < r7/f < 2.0 \quad (10)$$

Where, f is a focal length of the entire image pickup lens system, fa is a focal length of the air lens formed by the image side surface of the third lens, and the object side surface of the fourth lens, and satisfies the following expression.

$$fa = R6 \times R7 / \{R7 \times (1-N3) + R6 \times (N4-1) - D6 \times (1-N3) \times (N4-1)\}$$

where,
N3 is a refractive index of the third lens to d-line,
N4 is a refractive index of the fourth lens to d-line,
R6 is a radius of curvature of the image side surface of the third lens,
R7 is a radius of curvature of the object side surface of the fourth lens,
D6 is an air distance between the third lens and the fourth lens along an optical axis,
r7 is a radius of curvature of the object side surface of the fourth lens.

The conditional expression (9) is an expression for adequately setting a positive refractive power of the air lens formed between the third lens image side surface and the fourth lens object side surface. When the conditional expression (9) is satisfied, the correction of the image side curvature or distortion aberration and a good image side telecentricity can be secured. Further, the conditional expression (10) is an expression for adequately setting the refractive power of the object side surface of the fourth lens. When the conditional expression (10) is satisfied, the refractive power of the air lens regulated by the conditional expression (9) can be appropriately allotted to the two refractive surfaces, and the generation of the aberration herein can be suppressed.

In the structure written in item 15, the image pickup lens written in item 16 satisfies the following conditional expression.

$$0.30 < r7/f < 1.0 \quad (11)$$

The conditional expression (11) is an expression for adequately setting the refractive power of the object side surface of the fourth lens. When the conditional expression (11) is satisfied, the refractive power of the air lens regulated by the conditional expression (9) can be more adequately allotted to two refractive surfaces, and the generation of the aberration herein can be suppressed.

As for the image pickup lens written in item 17, in the structure written in any one of items 1–16, the first lens comprises a glass material, the second lens, the third lens and the fourth lens comprise a plastic material and the image pickup lens satisfies a following conditional expression:

$$|f/f234| < 0.5 \quad (12)$$

where f is a focal length of an entire system of the image pickup lens and f234 is a composite focal length of the second lens, the third lens and fourth lens which comprise a plastic material.

When all lenses forming the image pickup lens are plastic lenses fabricated by injection molding, it is advantageous to reduce the size and the weight of the image pickup lens and to save the cost of the image pickup lens. However, a refractive index change of a plastic material at the time of a temperature change is large and it makes a defect such that a temperature variation changes an image point position of the all lenses when the all lenses are plastic lenses.

Therefore, the first positive lens is formed of a glass material which does not almost change its refractive index at the time of a temperature change, and the others, namely, the second lens, the third lens, and the fourth lens are formed of a plastic material. It can compensate the change of image point position at the time of the temperature change in the entire system of the lens while plastic lenses are used abundantly. By optimizing distribution of the refractive power for the second, third, and fourth lenses, changes of the image point position affected by the temperature change are canceled each other. It can suppress a change of the image point position of the total lens system at the time of the temperature change. Moreover, by using the first lens as a glass lens, a plastic lens which is easy to get damaged cannot be exposed, and it can be made preferable construction.

Conditional expression (12) specifies a composite focal length of the second lens, the third lens and fourth lens which are formed of plastic.

The change of the image point position at the time of a temperature change can be suppressed by making a composite refractive power small (making a composite focal length large) so that the conditional expression is satisfied. Furthermore, it is preferable that the following expression is satisfied.

$$|f/f234|<0.35 \qquad (12')$$

Because the image pickup device written in item 18 is provided with the image pickup lens written in any one of items 1 to 17, and a solid image pickup element, when the image pickup lens of the present invention is used, the image pickup device which is small sized and high performance, can be obtained.

According to an embodiment concerning with the present invention, an image pickup lens of 4-group 4-lens composition which is small sized and in which aberrations are finely corrected, and which has a good image side telecentricity, and an image pickup device using it can be offered.

Based on the drawings, embodiments and examples of the present invention will be detailed below, however, the present invention is not limited to these embodiments and examples. Hereupon, in the present invention, "plastic lens" includes a lens in which a plastic material is a base material, and which is molded of a material in which small diameter particles are dispersed in the plastic material, and in which a volume ratio of the plastic is more than a half, and also includes the lens further conducted a coating processing on it for a purpose of the reflection prevention or the increase of the surface hardness.

Further, in the image pickup device mounted on a mobile phone or a small sized information terminal, there are many cases where a wide image pickup lens is desired. For example, there is a method to use in which the photographer stretches his arm and has the image pickup device or the information device on which the image pickup device is mounted, and photographs himself as the subject. An image angle appropriate for a case of such a photographing is more than about 60°. Further, in the case where a so-called digital zoom function by which an apparent photographic range is changed when a part of the photographed digital image is enlarged and displayed, is provided, it is desired that the image angle owned by its photographic lens is as wide as possible. Accordingly, in the present specification, when a term of a wide angle image pickup lens is used, it is defined to be a lens which has a focal length not larger than 38 mm when it is converted to the focal length of the image pickup lens corresponding to 35 mm film, desirably, the focal length of about 35 mm, and whose image angle is more than about 60°.

Further, it is required for the image pickup lens used for the image pickup device provided with a solid image pickup element, that it is image side telecentric for obtaining a good light receiving sensitivity in the entire range of the image surface. The image side telecentric means that, in each image height, a main ray is incident on the image pickup surface of the solid image pickup element at an angle parallel to the optical axis. By arranging micro lens arrays appropriately on the image formation surface of the solid image pickup element, unsatisfied amount of the image side telecentric can be corrected recently. Specifically, a lens array pitch of a microlens array is fixed slightly smaller than a picture element pitch of each picture element on the image pickup surface. Accordingly, since microlenses of the microlens array on more peripheral image area is arranged to be shifted closer to the optical axis side of the image pickup lens, the grazing incidence light flux can be efficiently conducted to the light receiving section of each picture element. In order to obtain good light receiving sensitiveness and image quality throughout the image area at this time, it is desirable that they have the characteristics so that an incident angle of the principal ray to the image pickup surface has linearity to image height as much as possible. Accordingly, in the present specification, when a term of a good telecentricity is used, it is defined to means that the incident angle of the principal ray on the most peripheral portion of the image pickup surface is about not larger than 25°.

FIG. 1 is a sectional view in the optical axis direction of the image pickup device including the image pickup lens of Example 1. In FIG. 1, the image pickup lens includes, in order from the object side, an aperture stop S, first lens L1, second lens L2, third lens L3, fourth lens L4, and the image pickup device includes this image pickup lens, a low-pass filter LPF (infrared ray cut coating is conducted on the object side surface) which is arranged on the image side of the image pickup lens, and in which, for example, a quartz is used, and solid image pickup element IS such as CMOS, or CCD. It is structured in such a manner that the optical image image-formed on an image pickup surface I which passes through the image pickup lens and optical low-pass filter LPF, cover glass (parallel flat plate) CG of the solid image pickup element IS, is photo-electrically converted by the solid image pickup element IS, and further, when a predetermined processing is conducted, it is converted into an image signal.

Herein, a preferable example of the present embodiment will be described. Hereupon, signs used for the example described below are as follows.

f: focal length of the entire image pickup lens system,

F: F number,

2Y: diagonal line length of the rectangular effective pixel area of the image pickup surface of the solid image pickup element, 2ω: image angle, R (or r): radius of curvature, D (or d): surface interval on axis, Nd (or nd): refractive index to d-line of the lens material, vd: Abbe constant of a lens material.

In each example, the shape of aspheric surface is, in the orthogonal coordinates in which an apex of the surface is an origin, and the optical axis direction is X-axis, when the apex curvature is C, conical constant is K, aspheric surface coefficients are A4, A6, A8, A10, A12, expressed by the following expression.

$$X = \frac{Ch^2}{1+\sqrt{1-(1+K)C^2h^2}} + A_4h^4 + A_6h^6 + A_8h^8 + A_{10}h^{10} + A_{12}h^{12}$$

where $h=\sqrt{Y^2+Z^2}$
and where
Ai is i-th order aspheric surface coefficient, C is a curvature and K is a conical constant.

EXAMPLE 1

In an image pickup lens (Example 1) appropriate for the image pickup device shown in FIG. 1, a value of a focal length (f) is 4.65 mm, a value of F number (F) is 4.12 and a value of image angle (2ω) is 63.2°.

Further, the lens data of Example 1 is shown in Table 1. Hereupon, hereinafter, (including the lens data in Table), the exponent of 10 (for example, $2.5 \times 10^{-03}$) is expressed by using E (for example, 2.5 E-03).

TABLE 1

Example 1

| | r | d | nd | νd |
|---|---|---|---|---|
| Stop | ∞ | 0.15 | | |
| 1 | 7.236 | 1.28 | 1.53175 | 56.5 |
| 2 | −1.651 | 0.58 | | |
| 3 | −1.094 | 0.65 | 1.58300 | 30.0 |
| 4 | −7.018 | 0.17 | | |
| 5 | −3.852 | 1.07 | 1.53175 | 56.5 |
| 6 | −1.674 | 0.15 | | |
| 7 | 1.981 | 0.74 | 1.53175 | 56.5 |
| 8 | 1.681 | 1.29 | | |
| 9 | ∞ | 0.47 | 1.54880 | 67.0 |
| 10 | ∞ | 0.20 | | |
| 11 | ∞ | 0.30 | 1.51633 | 64.1 |
| 12 | ∞ | | | |

Aspheric surface coefficient

The 1st surface

κ = 8.39056E+01
A4 = −7.95109E−02
A6 = 9.07040E−03
A8 = −1.36266E−01

The 2nd surface

κ = 2.62549E−01

The 3rd surface

κ = −6.96564E−01
A4 = 5.36294E−02
A6 = 2.15506E−02
A8 = −1.90238E−03

The 4th surface

κ = −5.25529E+01

The 5th surface

κ = −4.43794E+01

The 6th surface

κ = −4.37267
A4 = −4.58027E−02
A6 = 2.19871E−02
A8 = −3.90408E−03
A10 = 3.67144E−04
A12 = −1.40145E−05

The 7th surface

κ = −2.71095
A4 = −5.02280E−02
A6 = 1.03605E−02
A8 = −1.55149E−03
A10 = 5.49648E−05
A12 = −7.61123E−06

The 8th surface

TABLE 1-continued

Example 1

κ = −5.60134
A4 = −3.64013E−02
A6 = 5.19954E−03
A8 = −5.12102E−04
A10 = −3.55924E−05
A12 = 4.52479E−06

FIGS. 2(*a*)–2(*d*) are aberration views of Example 1 (spherical aberration 2(*a*), astigmatism 2(*b*), distortion aberration 2(*c*), meridional coma 2(*d*)). In Example 1, the first lens, third lens, and fourth lens are formed of plastic material of poly olefin, and saturation water absorption is not larger than 0.01%. Further, the second lens is formed of plastic material of polycarbonate, and saturation water absorption is not larger than 0.4%.

EXAMPLE 2

Figure 3:
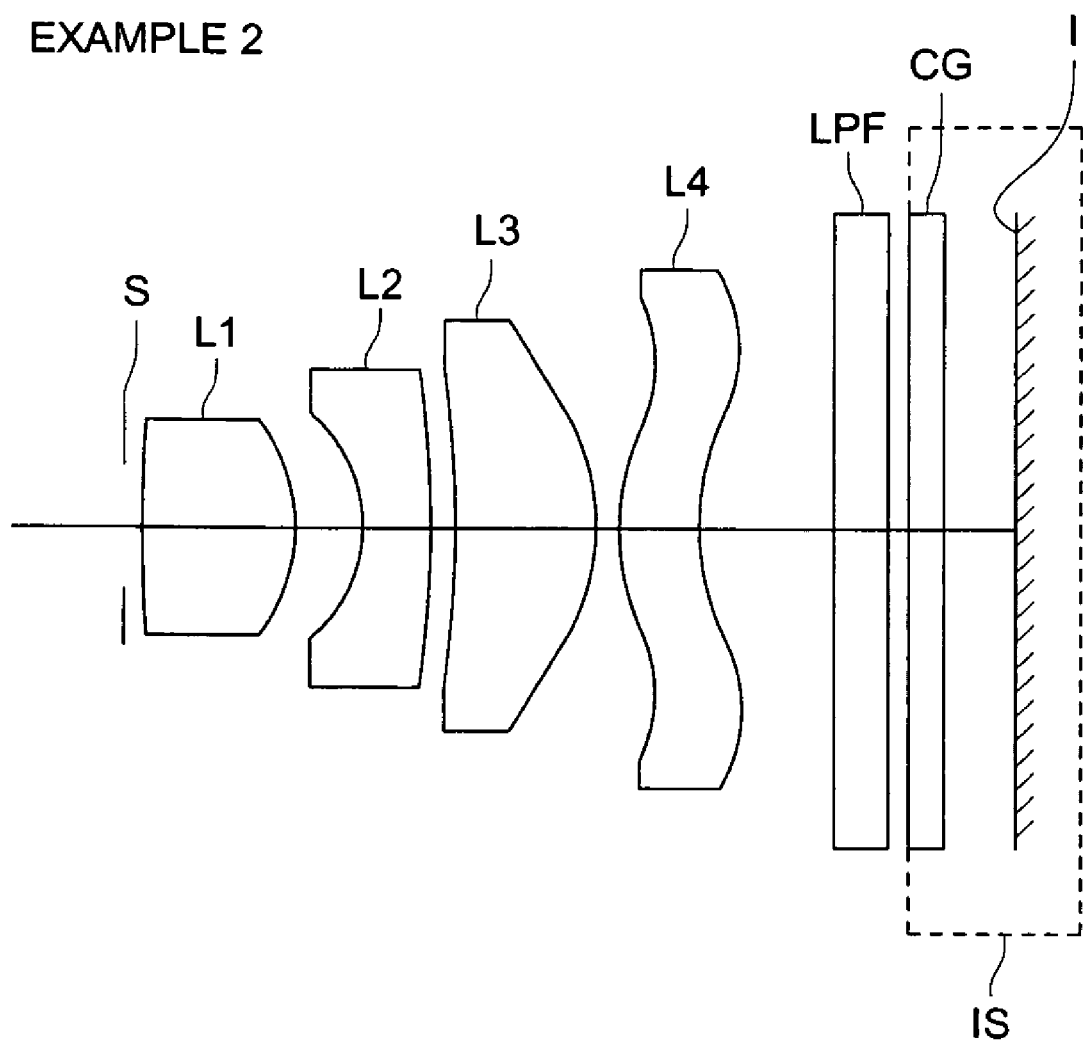
FIG. 3 is an optical axis direction sectional view of an image pickup device including an image pickup lens of Example 2.

FIG. 3 is a sectional view in the optical axis direction of the image pickup device including the image pickup lens of Example 2. In FIG. 3, the image pickup lens includes, in order from the object side, an aperture stop S, first lens L1, second lens L2, third lens L3, fourth lens L4, and the image pickup device includes this image pickup lens, a low-pass filter LPF (infrared ray cut coating is conducted on the object side surface) which is arranged on the image side of the image pickup lens, and in which, for example, a quartz is used, and solid image pickup element IS such as CMOS, or CCD. It is structured in such a manner that the optical image image-formed on an image pickup surface I which passes through the image pickup lens and optical low-pass filter LPF, cover glass (parallel flat plate) CG of the solid image pickup element IS, is photo-electrically converted by the solid image pickup element IS, and further, when a predetermined processing is conducted, it is converted into an image signal.

In an image pickup lens (Example 2) appropriate for the image pickup device shown in FIG. 3, a value of a focal length (f) is 4.65 mm, a value of F number (F) is 4.12 and a value of image angle (2ω) is 63. 2°.

Further, the lens data of Example 2 is shown in Table 2. FIGS. 4(*a*)–4(*d*) are aberration views of Example 2 (spherical aberration 4(*a*), astigmatism 4(*b*), distortion aberration 4(*c*), meridional coma 4(*d*)). In Example 2, the first lens, third lens, and fourth lens are formed of plastic material of poly olefin, and saturation water absorption is not larger than 0.01%. Further, the second lens is formed of plastic material of polycarbonate, and saturation water absorption is not larger than 0.4%.

TABLE 2

Example 2

| | r | d | nd | νd |
|---|---|---|---|---|
| Stop | ∞ | 0.15 | | |
| 1 | 13.866 | 1.30 | 1.52500 | 56.5 |
| 2 | −1.483 | 0.62 | | |
| 3 | −1.055 | 0.68 | 1.58300 | 30.0 |
| 4 | −12.187 | 0.18 | | |
| 5 | −12.187 | 1.30 | 1.52500 | 56.5 |
| 6 | −1.966 | 0.15 | | |
| 7 | 2.126 | 0.75 | 1.52500 | 56.5 |
| 8 | 1.970 | 1.17 | | |

TABLE 2-continued

| | | Example 2 | | |
|---|---|---|---|---|
| 9 | ∞ | 0.47 | 1.54880 | 67.0 |
| 10 | ∞ | 0.20 | | |
| 11 | ∞ | 0.30 | 1.51633 | 64.1 |
| 12 | ∞ | | | |

Aspheric surface coefficient

The 1st surface

κ = 4.57833E+01
A4 = −5.60287E−02
A6 = −7.67818E−03
A8 = −5.13585E−02

The 2nd surface

κ = 2.95640E−01
A4 = 1.82739E−02
A6 = −5.57093E−03
A8 = 8.32102E−03

The 3rd surface

κ = −4.86482E−01
A4 = 8.94269E−02
A6 = −5.22611E−03
A8 = 1.74987E−02

The 6th surface

κ = −3.66691
A4 = −4.88712E−02
A6 = 1.87423E−02
A8 = −4.38942E−03
A10 = 6.83955E−04
A12 = −4.79752E−05

The 7th surface

κ = −1.37001
A4 = −4.02812E−02
A6 = 4.37933E−03
A8 = −7.21601E−04
A10 = 1.03046E−04
A12 = −1.30196E−05

The 8th surface

κ = −1.74223
A4 = −4.36482E−02
A6 = 5.11354E−03
A8 = −4.07482E−04
A10 = −3.85195E−06
A12 = 8.75808E−07

EXAMPLE 3

Figure 5:
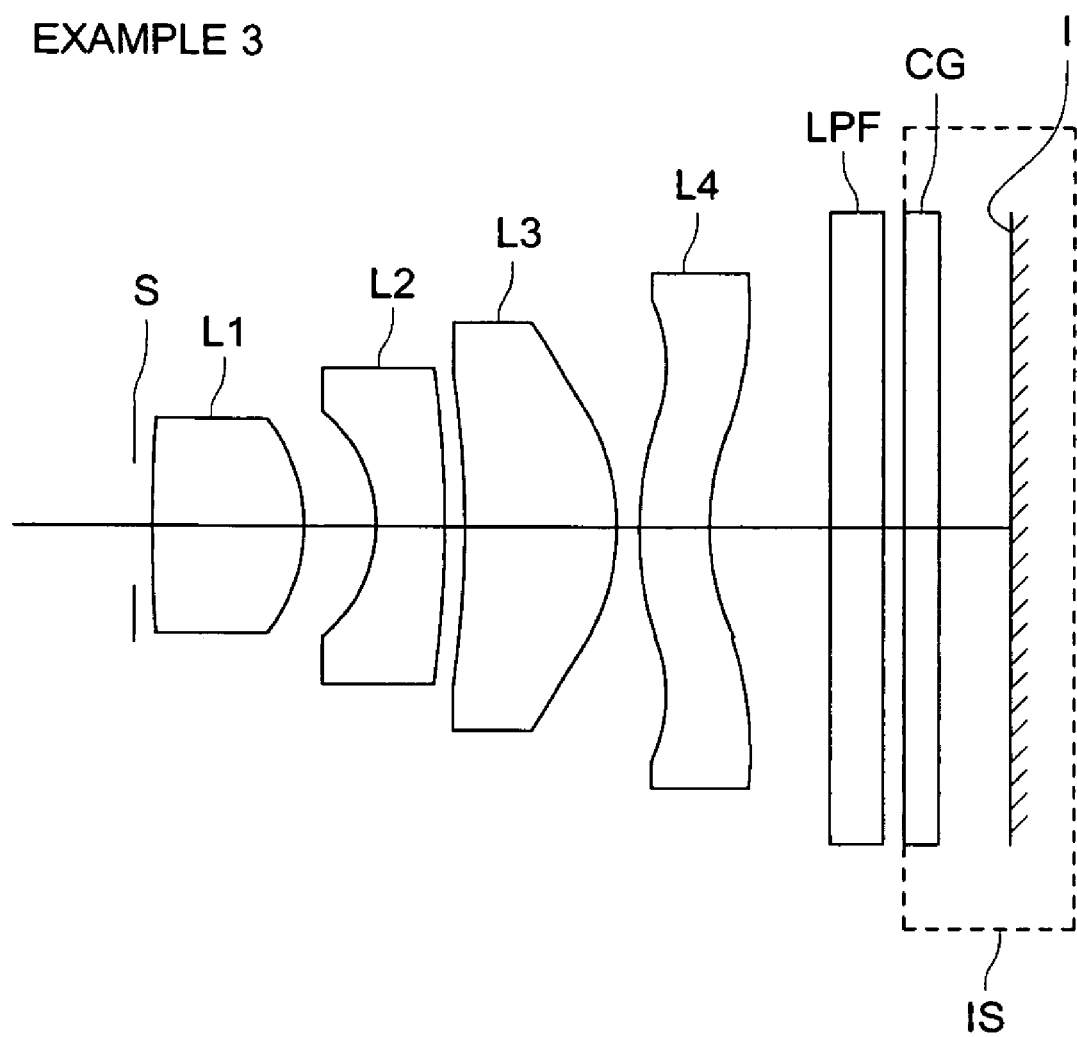
FIG. 5 is an optical axis direction sectional view of an image pickup device including an image pickup lens of Example 3.
Figure 10:
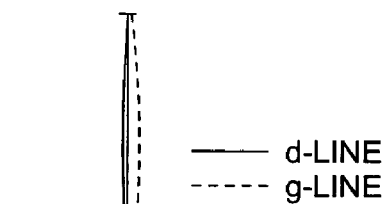
FIGS. 10(a)–10(d) are aberration views (spherical aberration 10(a), astigmatism 10(b), distortion aberration 10(c), meridional coma 10(d)) of Example 5.
Figure 10:
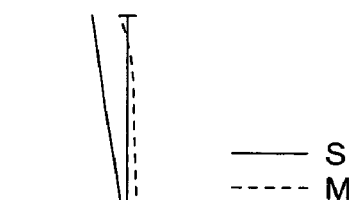
Figure 10:
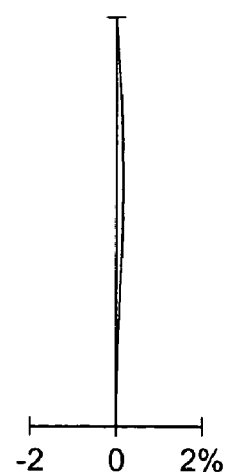

FIG. 5 is a sectional view in the optical axis direction of the image pickup device including the image pickup lens of Example 3. In FIG. 5, the image pickup lens includes, in order from the object side, an aperture stop S, first lens L1, second lens L2, third lens L3, fourth lens L4, and the image pickup device includes this image pickup lens, an optical low-pass filter LPF (infrared ray cut coating is conducted on the object side surface) which is arranged on the image side of the image pickup lens, and in which, for example, a quartz is used, and solid image pickup element IS such as CMOS, or CCD. It is structured in such a manner that the optical image image-formed on an image pickup surface I which passes through the image pickup lens and optical low-pass filter LPF, cover glass (parallel flat plate) CG of the solid image pickup element IS, is photo-electrically converted by the solid image pickup element IS, and further, when a predetermined processing is conducted, it is converted into an image signal.

In an image pickup lens (Example 3) appropriate for the image pickup device shown in FIG. 5, a value of a focal length (f) is 4.62 mm, a value of F number (F) is 4.00 and a value of image angle (2ω) is 62.7°.

Further, the lens data of Example 3 is shown in Table 3. FIGS. 6(a)–6(d) are aberration views of Example 3 (spherical aberration 6(b), distortion aberration 6(c), meridional coma 6(d)). In Example 3, the first lens and third lens, are formed of plastic material of poly olefin, and a saturation water absorption is not larger than 0.01%. Further, the second lens and fourth lens are formed of plastic material of polycarbonate, and saturation water absorption is not larger than 0.4%.

TABLE 3

| | | Example 3 | | |
|---|---|---|---|---|
| | r | d | nd | νd |
| Stop | ∞ | 0.15 | | |
| 1 | 9.249 | 1.40 | 1.52500 | 56.5 |
| 2 | −1.533 | 0.56 | | |
| 3 | −1.071 | 0.70 | 1.58300 | 30.0 |
| 4 | −8.630 | 0.18 | | |
| 5 | −8.630 | 1.40 | 1.52500 | 56.5 |
| 6 | −1.475 | 0.15 | | |
| 7 | 2.999 | 0.75 | 1.58300 | 30.0 |
| 8 | 1.747 | 1.03 | | |
| 9 | ∞ | 0.47 | 1.54880 | 67.0 |
| 10 | ∞ | 0.20 | | |
| 11 | ∞ | 0.30 | 1.51633 | 64.1 |
| 12 | ∞ | | | |

Aspheric surface coefficient

The 1st surface

κ = 7.74968E+01
A4 = −5.43603E−02
A6 = −1.03748E−02
A8 = −3.95053E−02

The 2nd surface

κ = 1.51227E−01
A4 = 1.14048E−02
A6 = 9.90814E−05
A8 = 1.32594E−03

The 3rd surface

κ = −6.02209E−01
A4 = 5.67399E−02
A6 = 6.07239E−03
A8 = 5.95071E−03

The 6th surface

κ = −3.28843
A4 = −4.94607E−02
A6 = 1.89462E−02
A8 = −4.61869E−03
A10 = 7.34290E−04
A12 = −5.24586E−05

The 7th surface

κ = −4.50902
A4 = −2.96054E−02
A6 = 4.99689E−03
A8 = −1.04125E−03
A10 = 1.25386E−04
A12 = −1.19113E−05

The 8th surface

κ = −5.75256
A4 = −2.27327E−02
A6 = 2.33017E−03
A8 = −1.35574E−04
A10 = −1.68679E−05
A12 = 1.56179E−06

EXAMPLE 4

FIG. 7 is a sectional view in the optical axis direction of the image pickup device including the image pickup lens of Example 4. In FIG. 7, the image pickup lens includes, in order from the object side, an aperture stop S, first lens L1, second lens L2, third lens L3, fourth lens L4, and the image pickup device includes this image pickup lens, an optical low-pass filter LPF (infrared ray cut coating is conducted on the object side surface) which is arranged on the image side of the image pickup lens, and in which, for example, a quartz is used, and solid image pickup element IS such as CMOS, or CCD. It is structured in such a manner that the optical image image-formed on an image pickup surface I which passes through the image pickup lens and optical low-pass filter LPF, cover glass (parallel flat plate) CG of the solid image pickup element IS, is photo-electrically converted by the solid image pickup element IS, and further, when a predetermined processing is conducted, it is converted into an image signal.

In an image pickup lens (Example 4) appropriate for the image pickup device shown in FIG. 7, a value of a focal length (f) is 4.65 mm, a value of F number (F) is 2.88 and a value of image angle (2ω) is 62.3°.

Further, the lens data of Example 4 is shown in Table 4. FIGS. 8(a)–8(d) are aberration views of Example 3 (spherical aberration 8(a), astigmatism 8(b), distortion aberration 8(c), meridional coma 8(d)). In Example 4, the first lens and third lens, are formed of plastic material of poly olefin, and a saturation water absorption is not larger than 0.01%. Further, the second lens and fourth lens are formed of plastic material of polycarbonate, and saturation water absorption is not larger than 0.4%.

TABLE 4

Example 4

|  | r | d | nd | vd |
|---|---|---|---|---|
| Stop | ∞ | 0.15 | | |
| 1 | 5.825 | 1.32 | 1.52500 | 56.5 |
| 2 | −1.993 | 0.55 | | |
| 3 | −1.220 | 0.68 | 1.58300 | 30.0 |
| 4 | −16.083 | 0.15 | | |
| 5 | −20.553 | 1.40 | 1.52500 | 56.5 |
| 6 | −1.538 | 0.15 | | |
| 7 | 3.124 | 0.75 | 1.58300 | 30.0 |
| 8 | 1.897 | 1.05 | | |
| 9 | ∞ | 0.47 | 1.54880 | 67.0 |
| 10 | ∞ | 0.20 | | |
| 11 | ∞ | 0.30 | 1.51633 | 64.1 |
| 12 | ∞ | | | |

Aspheric surface coefficient

The 1st surface $\kappa = -1.00000E+02$
$A4 = 2.65868E-02$
$A6 = -4.86628E-02$

The 2nd surface $\kappa = 5.15673E-01$
$A4 = -1.71090E-02$
$A6 = 1.55738E-03$
$A8 = -3.14882E-03$ The 3rd surface $\kappa = -7.23406E-01$
$A4 = -6.54775E-04$
$A6 = 7.92681E-03$
$A8 = 2.90611E-03$ TABLE 4-continued Example 4

The 4th surface $\kappa = 5.95690E+01$
$A4 = -2.51279E-03$
$A6 = -1.65511E-04$

The 5th surface $\kappa = 5.05657E+01$
$A4 = 1.02080E-03$
$A6 = 2.78159E-04$
$A8 = 2.73319E-04$ The 6th surface $\kappa = -3.26915$
$A4 = -4.41255E-02$
$A6 = 1.77371E-02$
$A8 = -3.84091E-03$
$A10 = 7.22174E-04$
$A12 = -5.28995E-05$ The 7th surface $\kappa = -5.74369E-01$
$A4 = -4.08524E-02$
$A6 = 6.31477E-03$
$A8 = -8.78856E-04$
$A10 = 4.15237E-05$
$A12 = -1.79587E-06$ The 8th surface $\kappa = -5.42493$
$A4 = -2.60921E-02$
$A6 = 4.25295E-03$
$A8 = -5.52348E-04$
$A10 = 2.50787E-05$
$A12 = -1.85705E-08$

EXAMPLE 5

FIG. 9 is a sectional view in the optical axis direction of the image pickup device including the image pickup lens of Example 5. In FIG. 9, the image pickup lens includes, in order from the object side, an aperture stop S, first lens L1, second lens L2, third lens L3, fourth lens L4, and the image pickup device includes this image pickup lens, an infrared ray cut filter IRCF on which infrared ray cut coating is conducted on the object side surface, and which is arranged on the image side of the image pickup lens, and a solid image pickup element IS such as CMOS, or CCD. It is structured in such a manner that the optical image image-formed on an image pickup surface I which passes through the image pickup lens and infrared ray cut filter IRCF, cover glass (parallel flat plate) CG of the solid image pickup element IS, is photo-electrically converted by the solid image pickup element IS, and further, when a predetermined processing is conducted, it is converted into an image signal.

In an image pickup lens (Example 5) appropriate for the image pickup device shown in FIG. 9, a value of a focal length (f) is 4.62 mm, a value of F number (F) is 4.00 and a value of image angle (2ω) is 63.3°.

Further, the lens data of Example 5 is shown in Table 5. FIGS. 10(a)–10(d) are aberration views of Example 5 (spherical aberration 10(a), astigmatism 10(b), distortion aberration 10(c), meridional coma 10(d)). In Example 5, the radius of curvature of the image side surface of the second lens and that of the object side surface of the third lens are equal, and further, they are adjoined or adhered to each other without though the mutual air intervals. Further, the first lens and third lens are formed of plastic material of poly olefin, and saturation water absorption is not larger than 0.01%. Further, the second lens and fourth lens are formed of plastic material of polycarbonate, and saturation water absorption is not larger than 0.4%.

TABLE 5

Example 5

| | r | d | nd | vd |
|---|---|---|---|---|
| Stop | ∞ | 0.15 | | |
| 1 | 8.561 | 1.40 | 1.52500 | 56.5 |
| 2 | −1.704 | 0.61 | | |
| 3 | −1.067 | 0.70 | 1.58300 | 30.0 |
| 4 | −9.575 | 1.42 | 1.52500 | 56.5 |
| 5 | −1.324 | 0.15 | | |
| 6 | 3.004 | 0.75 | 1.58300 | 30.0 |
| 7 | 1.608 | 1.24 | | |
| 8 | ∞ | 0.30 | 1.51633 | 64.1 |
| 9 | ∞ | 0.20 | | |
| 10 | ∞ | 0.30 | 1.51633 | 64.1 |
| 11 | ∞ | | | |

Aspheric surface coefficient

The 1st surface $\kappa = 3.0941E+01$
$A4 = -4.20340E-02$
$A6 = -1.13374E-02$
$A8 = -1.90511E-02$ The 2nd surface $\kappa = 1.35971E-01$
$A4 = -4.78147E-03$
$A6 = -7.47998E-04$
$A8 = -9.83205E-04$ The 3rd surface $\kappa = -6.59894E-01$
$A4 = 4.38158E-02$
$A6 = 8.09796E-03$
$A8 = 5.33414E-03$ The 5th surface $\kappa = -3.23815$
$A4 = -5.04236E-02$
$A6 = 1.94768E-02$
$A8 = -4.78251E-03$
$A10 = 8.22955E-04$
$A12 = -6.25846E-05$ The 6th surface $\kappa = -4.62711$
$A4 = -1.56563E-02$
$A6 = 3.13815E-03$
$A8 = -9.28166E-04$
$A10 = 1.28099E-04$
$A12 = -1.02368E-05$ The 7th surface $\kappa = -6.32956$
$A4 = -1.09488E-02$
$A6 = 8.20999E-04$
$A8 = -1.02748E-04$
$A10 = -4.96748E-06$
$A12 = 5.93535E-07$

EXAMPLE 6

Figure 11:
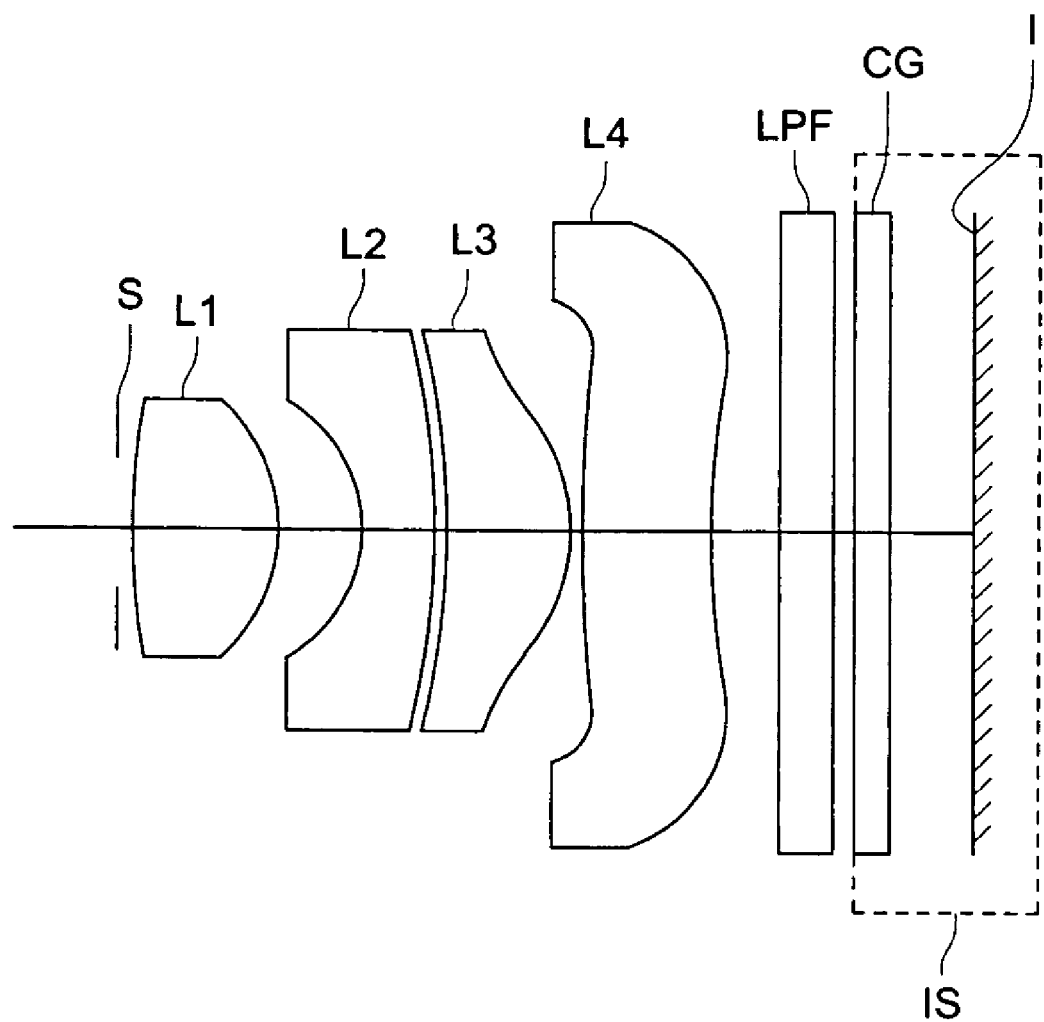
FIG. 11 is an optical axis direction sectional view of an image pickup device including an image pickup lens of Example 6.

FIG. 11 is a sectional view in the optical axis direction of the image pickup device including the image pickup lens of Example 6. In FIG. 11, the image pickup lens includes, in order from the object side, an aperture stop S, first lens L1, second lens L2, third lens L3, fourth lens L4, and the image pickup device includes this image pickup lens, an optical low-pass filter LPF (infrared ray cut coating is conducted on the object side surface), which is arranged on the image side of the image pickup lens, and in which, for example, a quartz is used, and a solid image pickup element IS such as CMOS, or CCD. It is structured in such a manner that the optical image image-formed on an image pickup surface I which passes through the image pickup lens, optical low-pass filter LPF, and cover glass (parallel flat plate) CG of the solid image pickup element IS, is photo-electrically converted by the solid image pickup element IS, and further, when a predetermined processing is conducted, it is converted into an image signal.

In an image pickup lens (Example 6) appropriate for the image pickup device shown in FIG. 11, a value of a focal length (f) is 4.65 mm, a value of F number (F) is 4.12 and a value of image angle (2ω) is 62.7°.

The lens data of Example 6 is shown in Table 6. FIGS. 12(a)–12(d) are aberration views of Example 6 (spherical aberration 12(a), astigmatism 12(b), distortion aberration 12(c), meridional coma 12(d)). In Example 6, the first lens, third lens and fourth lens are formed of plastic material of poly olefin, and saturation water absorption is not larger than 0.01%. Further, the second lens is formed of plastic material of polycarbonate, and saturation water absorption is not larger than 0.4%.

TABLE 6

Example 6

| | r | d | nd | vd |
|---|---|---|---|---|
| Stop | ∞ | 0.15 | | |
| 1 | 7.958 | 1.29 | 1.53180 | 56.0 |
| 2 | −1.561 | 0.68 | | |
| 3 | −0.936 | 0.65 | 1.58300 | 30.0 |
| 4 | −3.276 | 0.13 | | |
| 5 | −2.812 | 1.06 | 1.53180 | 56.0 |
| 6 | −1.418 | 0.10 | | |
| 7 | 5.234 | 1.20 | 1.53180 | 56.0 |
| 8 | 2.997 | 0.60 | | |
| 9 | ∞ | 0.47 | 1.54880 | 67.0 |
| 10 | ∞ | 0.20 | | |
| 11 | ∞ | 0.30 | 1.51633 | 64.1 |
| 12 | ∞ | | | |

Aspheric surface coefficient

The 1st surface $K = 8.43399E+01$
$A4 = -7.35880E-02$
$A6 = -2.61210E-02$
$A8 = -6.90640E-02$ The 2nd surface $K = 2.72730E-01$ The 3rd surface $K = -8.03100E-01$
$A4 = 8.39410E-02$
$A6 = 7.14120E-03$
$A8 = 2.77020E-03$ The 4th surface $K = -8.79412E+01$ The 5th surface $K = -6.13808E+01$ The 6th surface $K = -3.09641E+00$
$A4 = -4.68940E-02$
$A6 = 2.44280E-02$
$A8 = -4.18730E-03$
$A10 = 1.98480E-04$
$A12 = 2.37300E-05$ TABLE 6-continued Example 6

The 7th surface

K = 2.91078E+00
A4 = −3.70840E−02
A6 = 4.28120E−03
A8 = −1.10320E−03
A10 = 1.30100E−04
A12 = −3.07420E−05

The 8th surface

K = −1.38677E+01
A4 = −3.27550E−02
A6 = 4.26100E−03
A8 = −4.39070E−04
A10 = −7.25940E−06
A12 = 1.99290E−06

EXAMPLE 7

Figure 13:
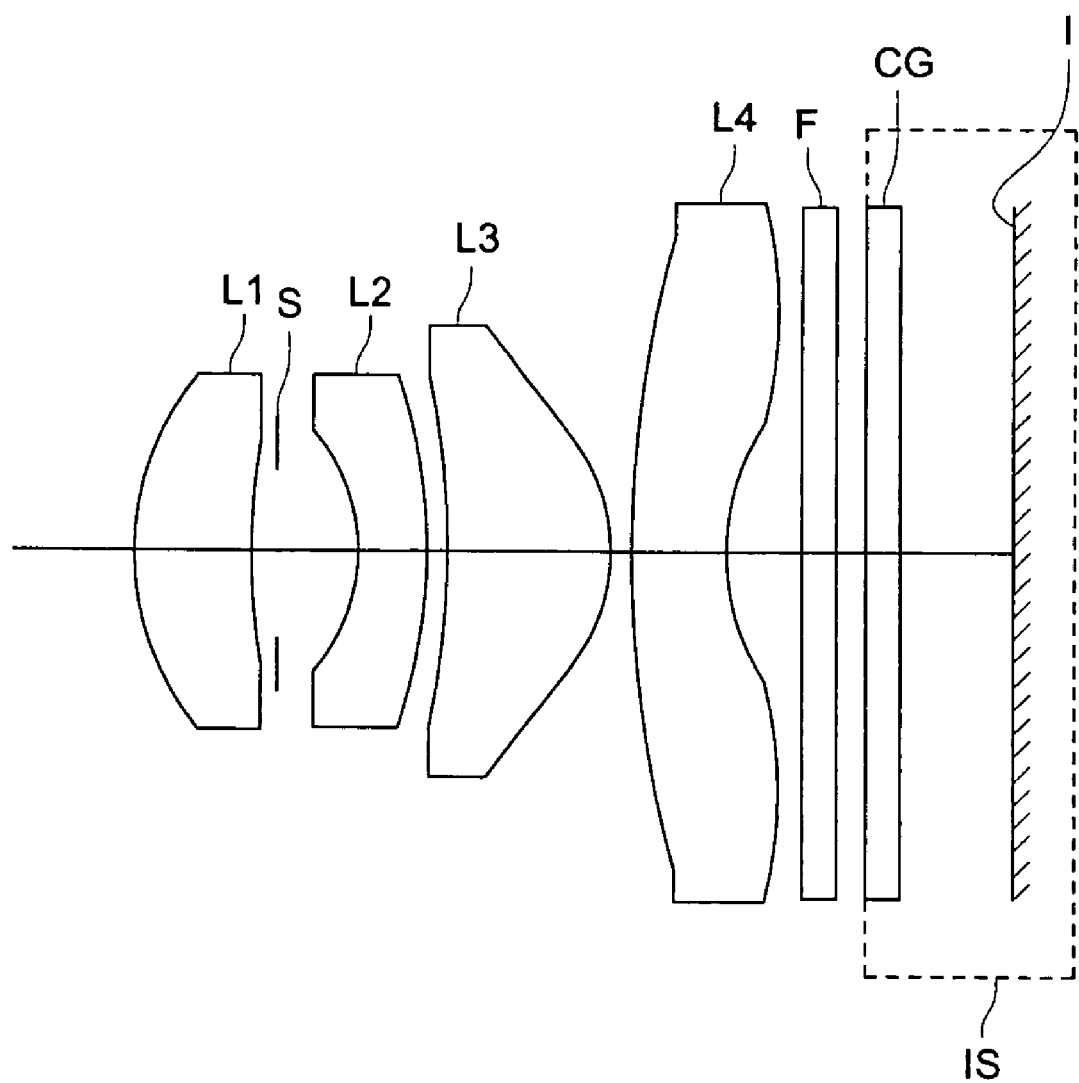
FIG. 13 is an optical axis direction sectional view of an image pickup device including an image pick-up lens of Example 7.

FIG. 13 is a sectional view in the optical axis direction of the image pickup device including the image pickup lens of Example 7. In FIG. 13, the image pickup lens includes, in order from the object side, the first lens L1, aperture stop S, second lens L2, third lens L3, fourth lens L4, and the image pickup device includes this image pickup lens, infrared ray cut filter IRCF in which infrared ray cut coating is conducted on the object side surface, which is arranged on the image side of the image pickup lens, cover glass (parallel flat plate) CG of the solid image pickup element IS and a solid image pickup element IS such as CMOS, or CCD. It is structured in such a manner that the optical image image-formed on an image pickup surface I which passes through the image pickup lens, infrared ray cut filter IRCF, and cover glass (parallel flat plate) CG of the solid image pickup element IS, is photo-electrically converted by the solid image pickup element IS, and further, when a predetermined processing is conducted, it is converted into an image signal.

In an image pickup lens (Example 7) appropriate for the image pickup device shown in FIG. 13, a value of a focal length (f) is 5.50 mm, a value of F number (F) is 2.88 and a value of image angle (2ω) is 64.0°.

The lens data of Example 7 is shown in Table 7. FIGS. 14($a$)–14($d$) are aberration views of Example 7 (spherical aberration 14($a$), astigmatism 14($b$), distortion aberration 14($c$), meridional coma 14($d$)). In Example 7, the first lens, third lens and fourth lens are formed of plastic material of poly olefin, and saturation water absorption is not larger than 0.01%. Further, the second lens is formed of plastic material of polycarbonate, and saturation water absorption is not larger than 0.4%.

TABLE 7

Example 7

| | r | d | nd | vd |
|---|---|---|---|---|
| 1 | 2.477 | 1.10 | 1.53180 | 56.0 |
| 2 | 11.243 | 0.19 | | |
| Stop | ∞ | 0.74 | | |
| 3 | −2.180 | 0.68 | 1.58300 | 30.0 |
| 4 | −7.412 | 0.20 | | |
| 5 | −9.670 | 1.54 | 1.53180 | 56.0 |
| 6 | −1.437 | 0.10 | | |
| 7 | 4.144 | 0.88 | 1.53180 | 56.0 |
| 8 | 1.520 | 0.80 | | |

TABLE 7-continued

Example 7

| | r | d | nd | vd |
|---|---|---|---|---|
| 9 | ∞ | 0.30 | 1.51633 | 64.1 |
| 10 | ∞ | 0.20 | | |
| 11 | ∞ | 0.30 | 1.51633 | 64.1 |
| 12 | ∞ | | | |

Aspheric surface coefficient

The 1st surface

K = −2.47670E−01
A4 = 4.83490E−03
A6 = 3.31920E−03
A8 = −1.26950E−03

The 2nd surface

K = 9.67450E+01
A4 = −8.54630E−03
A6 = −4.64990E−03
A8 = −7.78980E−03

The 3rd surface

K = 2.42150E+00
A4 = 7.97050E−03
A6 = −1.19640E−02
A8 = 2.18080E−02

The 4th surface

K = 1.80000E+01

The 5th surface

K = 1.58130E+01

The 6th surface

K = −3.17030E+00
A4 = −3.80560E−02
A6 = 7.60870E−03
A8 = −1.13750E−03
A10 = 2.28910E−04
A12 = −1.26560E−05

The 7th surface

K = −4.81110E+00
A4 = −2.92580E−02
A6 = 5.96020E−03
A8 = −5.63810E−04
A10 = 2.75130E−05
A12 = −5.15910E−07

The 8th surface

K = −5.28610E+00
A4 = −2.15710E−02
A6 = 2.34850E−03
A8 = −1.86730E−04
A10 = 1.07560E−05
A12 = −2.27920E−07

EXAMPLE 8

Figure 15:
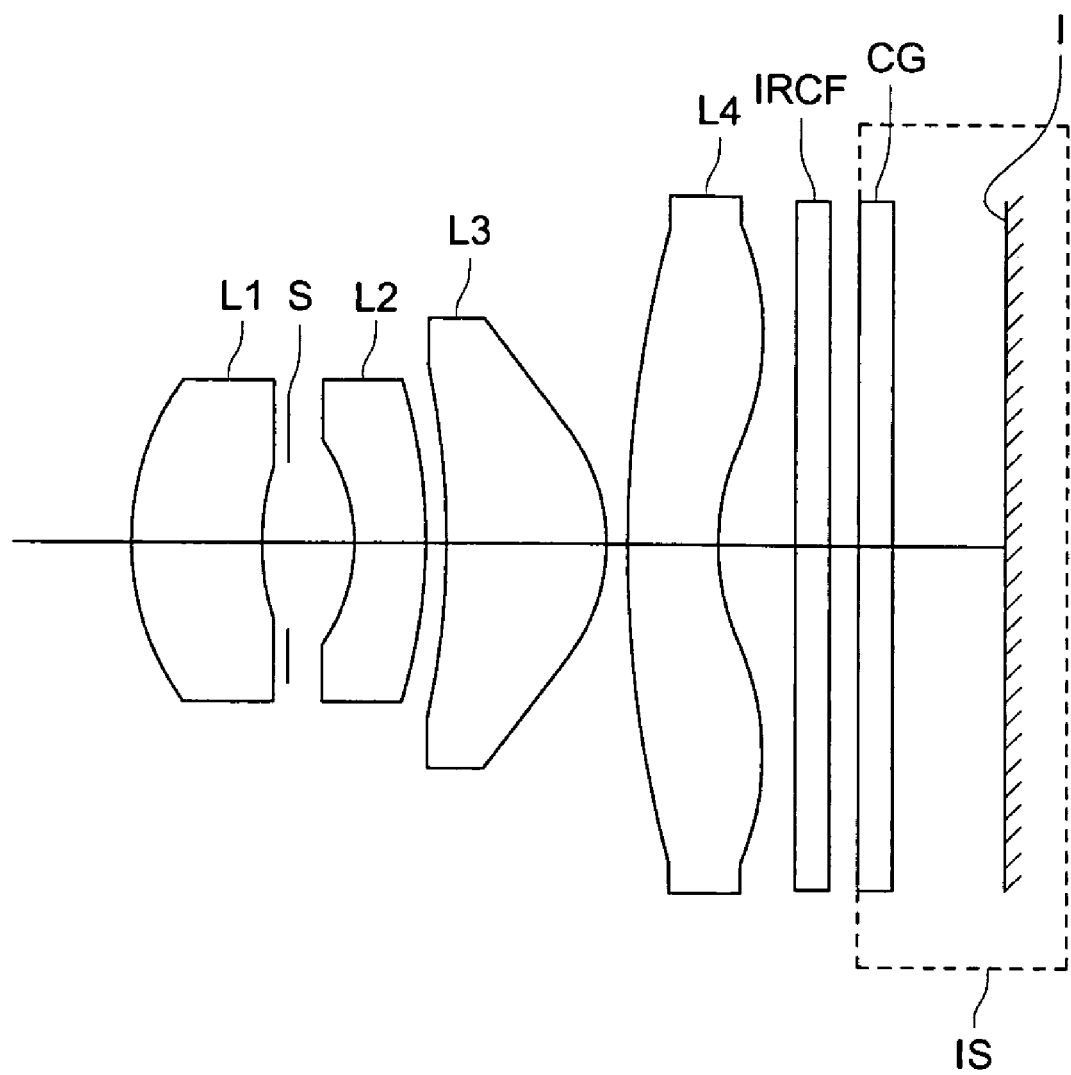
FIG. 15 is an optical axis direction sectional view of an image pickup device including an image pickup lens of Example 8.

FIG. 15 is a sectional view in the optical axis direction of the image pickup device including the image pickup lens of Example 8. In FIG. 15, the image pickup lens includes, in order from the object side, the first lens L1, aperture stop S, second lens L2, third lens L3, fourth lens L4, and the image pickup device includes this image pickup lens, infrared ray cut filter IRCF in which infrared ray cut coating is conducted on the object side surface, which is arranged on the image side of the image pickup lens, cover glass (parallel flat plate) CG of the solid image pickup element IS and solid image pickup element IS such as CMOS, or CCD. It is structured in such a manner that the optical image image-formed on an image pickup surface I which passes through the image pickup lens, infrared ray cut filter IRCF, and cover glass (parallel flat plate) CG of the solid image pickup element IS, is photo-electrically converted by the solid image pickup element IS, and further, when a predetermined processing is conducted, it is converted into an image signal.

In an image pickup lens (Example 8) appropriate for the image pickup device shown in FIG. 15, a value of a focal length (f) is 5.53 mm, a value of F number (F) is 2.88 and a value of image angle (2ω) is 63.5°.

The lens data of Example 8 is shown in Table 8. FIGS. 16(*a*)–16(*d*) are aberration views of Example 8 (spherical aberration 16(*a*), astigmatism 16(*b*), distortion aberration 16*c*), meridional coma 16(*d*)). In Example 8, the first lens is formed of glass mold lens, and second lens is formed of plastic material of polycarbonate, and saturation water absorption is not larger than 0.4%. Further, the third lens and fourth lens are formed of plastic material of poly olefin, and saturation water absorption is not larger than 0.1%.

TABLE 8

Example 8

| | r | d | nd | vd |
|---|---|---|---|---|
| 1 | 2.617 | 1.20 | 1.58913 | 61.2 |
| 2 | 11.119 | 0.18 | | |
| Stop | ∞ | 0.66 | | |
| 3 | −2.219 | 0.70 | 1.58300 | 30.0 |
| 4 | −7.883 | 0.20 | | |
| 5 | −9.908 | 1.59 | 1.53180 | 56.0 |
| 6 | −1.337 | 0.10 | | |
| 7 | 6.225 | 0.88 | 1.53180 | 56.0 |
| 8 | 1.561 | 0.80 | | |
| 9 | ∞ | 0.30 | 1.51633 | 64.1 |
| 10 | ∞ | 0.20 | | |
| 11 | ∞ | 0.30 | 1.51633 | 64.1 |
| 12 | ∞ | | | |

Aspheric surface coefficient

The 1st surface

K = −1.69240E−01
A4 = 3.00540E−03
A6 = 2.91710E−03
A8 = −1.36210E−03
The 2nd surface K = 1.00000E+02
A4 = −1.24640E−02
A6 = −6.24500E−03
A8 = −8.68590E−03
The 3rd surface K = 3.10850E+00
A4 = 8.72260E−03
A6 = −7.62140E−03
A8 = 3.03880E−02
The 4th surface K = 2.32730E+01
The 5th surface K = 1.26000E+01
The 6th surface K = −3.29350E+00
A4 = −3.76690E−02
A6 = 8.70350E−03
A8 = −1.15070E−03
A10 = 2.03650E−04
A12 = −9.64040E−06
The 7th surface

K = 4.32530E−01
A4 = −2.78340E−02
A6 = 5.78560E−03

TABLE 8-continued

Example 8

A8 = −5.77950E−04
A10 = 2.63770E−05
A12 = −3.43010E−07
The 8th surface

K = −6.76770E+00
A4 = −2.22940E−02
A6 = 2.65750E−03
A8 = −2.02450E−04
A10 = 9.47310E−06
A12 = −1.72580E−07

EXAMPLE 9

Figure 18:
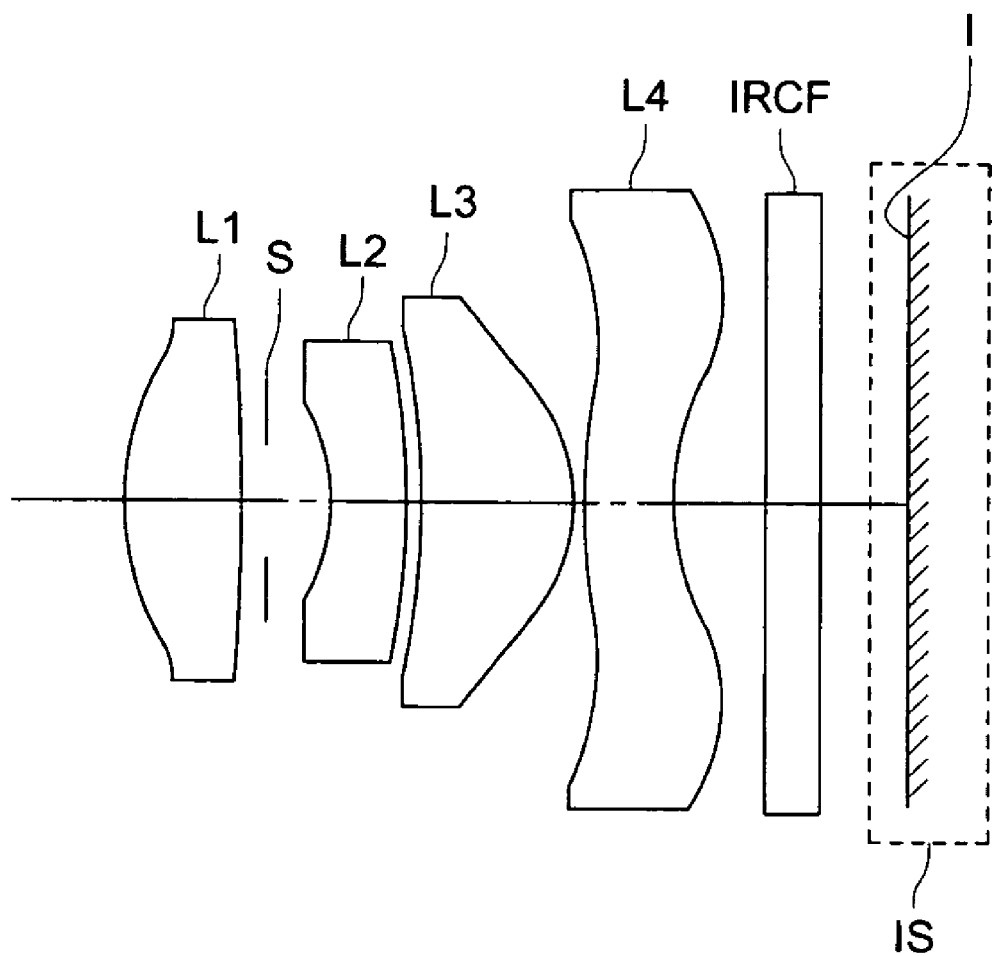
FIG. 18 is an optical axis direction sectional view of an image pickup device including an image pickup lens of Example 9.

FIG. 18 is a sectional view in the optical axis direction of the image pickup device including the image pickup lens of Example 9. In FIG. 18, the image pickup lens includes, in order from the object side, the first lens L1, aperture stop S, second lens L2, third lens L3, fourth lens L4, and the image pickup device includes this image pickup lens, infrared ray cut filter IRCF in which infrared ray cut coating is conducted on the object side surface, which is arranged on the image side of the image pickup lens, solid image pickup element IS such as CMOS, or CCD. It is structured in such a manner that the optical image image-formed on an image pickup surface I which passes through the image pickup lens, infrared ray cut filter IRCF, and cover glass (parallel flat plate) CG of the solid image pickup element IS, is photo-electrically converted by the solid image pickup element IS, and further, when a predetermined processing is conducted, it is converted into an image signal.

In an image pickup lens (Example 9) appropriate for the image pickup device shown in FIG. 18, a value of a focal length (f) is 4.66 mm, a value of F number (F) is 3.60 and a value of image angle (2ω) is 63.3°.

The lens data of Example 9 is shown in Table 9. FIGS. 19(*a*)–19(*d*) are aberration views of Example 9 (spherical aberration 19(*a*), astigmatism 19(*b*), distortion aberration 19(*c*), meridional coma 19(*d*)). In Example 9, the first lens is formed of glass mold lens, and second lens and fourth lens are formed of plastic material of polycarbonate, and saturation water absorption is not larger than 0.4%. Further, the third lens is formed of plastic material of poly olefin, and saturation water absorption is not larger than 0.01%.

TABLE 9

Example 9

| | r | d | nd | vd |
|---|---|---|---|---|
| 1 | 2.552 | 1.00 | 1.58913 | 61.2 |
| 2 | 18.403 | 0.27 | | |
| Stop | ∞ | 0.53 | | |
| 3 | −2.445 | 0.70 | 1.58300 | 30.0 |
| 4 | −10.293 | 0.12 | | |
| 5 | −6.143 | 1.40 | 1.53180 | 56.0 |
| 6 | −1.162 | 0.10 | | |
| 7 | 4.026 | 0.83 | 1.58300 | 30.0 |
| 8 | 1.237 | 0.80 | | |
| 9 | ∞ | 0.50 | 1.51633 | 64.1 |
| 10 | ∞ | | | |

TABLE 9-continued

Example 9

Aspheric surface coefficient

The 1st surface

K = −4.23520E−01
A4 = 1.47990E−03
A6 = 2.98450E−03
A8 = −3.75110E−03

The 2nd surface

K = −8.74260E+00
A4 = −1.18640E−02
A6 = −2.07250E−02
A8 = 9.04200E−03

The 3rd surface

K = 5.39120E+00
A4 = −8.53290E−03
A6 = −3.74680E−02
A8 = 7.70460E−02

The 4th surface

K = 5.00000E+01

The 5th surface

K = −3.28400E+01

The 6th surface

K = −2.97480E+00
A4 = −6.99950E−02
A6 = 2.34890E−02
A8 = −4.88340E−03
A10 = 2.47730E−05
A12 = 1.96530E−04

The 7th surface

K = −1.86870E+01
A4 = −4.08500E−02
A6 = 1.32550E−02
A8 = −2.26470E−03
A10 = 1.48610E−04
A12 = −2.70030E−06

The 8th surface

K = −5.40740E+00
A4 = −3.77390E−02
A6 = 8.10040E−03
A8 = −1.14700E−03
A10 = 7.09570E−05
A12 = −1.78310E−06

Relating to each example, values of conditional expressions (1)–(12) are collectively shown in Table 10.

TABLE 10

Corresponding Table to conditional expressions

| | Example 1 | Example 2 | Example 3 | Example 4 | Example 5 |
|---|---|---|---|---|---|
| f | 4.65 | 4.65 | 4.62 | 4.62 | 4.65 |
| Fno | 4.12 | 4.12 | 4.00 | 2.88 | 4.00 |
| Expressions (1), (4), (5), (8) (r3 + r4)/(r3 − r4) | −1.37 | −1.18 | −1.28 | −1.16 | −1.25 |
| Expression (2) v1 − v2 | 26.7 | 26.6 | 26.6 | 26.6 | 26.6 |
| Expression (3) v3 − v2 | 26.7 | 26.6 | 26.6 | 26.6 | 26.6 |
| Expression (6) (r1 + r2)/(r1 − r2) | 0.63 | 0.81 | 0.72 | 0.49 | 0.67 |
| Expression (7) f2/f | | | | | |
| Expression (9) fa/f | 0.38 | 0.43 | 0.40 | 0.42 | 0.37 |
| Expression (10), (11) r7/f | 0.43 | 0.46 | 0.65 | 0.68 | 0.65 |
| Expression (12) |f/f234| | | | | | |

TABLE 10-continued

Corresponding Table to conditional expressions

| | Example 6 | Example 7 | Example 8 | Example 9 |
|---|---|---|---|---|
| f | 4.65 | 5.50 | 5.53 | 4.66 |
| Fno | 4.12 | 2.88 | 2.88 | 3.60 |
| Expressions (1), (4), (5), (8) (r3 + r4)/(r3 − r4) | −1.80 | −1.83 | −1.78 | −1.62 |
| Expression (2) v1 − v2 | 26.0 | 26.0 | 31.2 | 31.2 |
| Expression (3) v3 − v2 | 26.0 | 26.0 | 26.0 | 26.0 |
| Expression (6) (r1 + r2)/(r1 − r2) | 0.67 | | | |
| Expression (7) f2/f | | −1.01 | −1.00 | −1.22 |
| Expression (9) fa/f | 0.45 | 0.37 | 0.38 | 0.36 |
| Expression (10), (11) r7/f | 1.13 | 0.75 | 1.13 | 0.86 |
| Expression (12) |f/f234| | | | 0.28 | 0.26 |

Hereupon, when all lenses composing the image pickup lens are composed of plastic lenses produced by the injection molding, a mass production can be conducted, further, because the aspheric surface can be easily added, the lens performance can be improved. On the one hand, there is a problem that the image point is varied due to a reason why the refractive index change is caused in the plastic material due to the environmental temperature change, however, recently, the image pickup device in which an auto-focus (AF) mechanism is installed is also developed, and in such an image pickup device, the variation of the image point does not become problem so much. Exactly, even when the AF mechanism is installed, in the image pickup device having a function of a variable focal length or a mode in which a focus is fixed to a point at infinity, another means for correcting the variation of the image point position is necessary. In such a case, it is allowable when, a temperature sensor is separately installed, and from the temperature information of the temperature sensor, a correction by which the distance to the image pickup surface of the image pickup lens and the solid image pickup element is finely adjusted, is conducted.

In the image pickup device in which the AF mechanism is not installed, the variation of image point position due to the environmental temperature change easily becomes a problem. In such a case, when a positive lens whose refractive power is strong in the image pickup lenses, (for example, the first lens in the present invention), is made a glass-mold lens formed of glass material, and a total sum of the refractive powers of remaining plastic lenses is suppressed to small value, the variation of the image point position at the time of temperature change can be decreased.

Further, recently, it has found that inorganic fine particles are mixed in the plastic material, and the temperature change of the refractive index of the plastic material can be suppressed small. When described in detail, when, generally, microparticles are mixed in the transparent plastic material, because the diffusion of ray is generated and the transmission rate is lowered, it is difficult to use as an optical material, however, when the size of the microparticle is made smaller than the wavelength of the transmission light flux, it is possible to attempt so that the diffusion is not practically generated. Although the refractive index of the plastic material is lowered when the temperature rises, the refractive index of the inorganic particles is increased when the temperature rises. Accordingly, when, by using these temperature dependency, they are made perform so as to be mutually cancelled out, it can be made so that the refractive index change is hardly generated. Specifically, when the inorganic particles whose maximum length is not larger than 20 nm, are dispersed in the plastic material as base material, the plastic material whose temperature dependency of the refractive index is vary low, is obtained. For example, when fine particles of acrylic and niobium oxide ($Nb_2O_5$) are dispersed, the refractive index change due to the temperature change can be decreased. When the plastic material in which such inorganic particles are dispersed, is used, the variation of the image point position at the time of temperature change of the entire image pickup lens system can be suppressed small.

What is claimed is:

1. An image pickup lens comprising:
   a first lens which is a positive lens having a positive refractive power;
   a second lens which is a negative lens having a negative refractive power;
   a third lens which is a positive lens having a positive refractive power;
   a fourth lens having at least one surface with an aspherical shape,
   wherein the first lens, the second lens, the third lens and the fourth lens are arranged from an object side of the image pickup lens in this order and
   the image pickup lens satisfies following conditional expressions:

$$-3.0 < (r3+r4)/(r3-r4) < -0.7 \qquad (1)$$

$$v1-v2 > 15.0 \qquad (2)$$

$$v3-v2 > 15.0 \qquad (3)$$

where r3 is a curvature radius of an object side surface of the second lens, r4 is a curvature radius of an image side surface of the second lens, v1, v2, and v3 are Abbe constants of the first to third lenses respectively.

2. The image pickup lens of claim 1 further comprising an aperture stop at a closest position to an object side of the image pickup lens.

3. The image pickup lens of claim 2 which satisfies a following conditional expression:

$$-1.5 < (r3+r4)/(r3-r4) < -0.7 \qquad (4)$$

where r3 is a curvature radius of an object side surface of the second lens and r4 is a curvature radius of an image side surface of the second lens.

4. The image pickup lens of claim 2 which satisfies a following conditional expression:

$$-1.5 < (r3+r4)/(r3-r4) < -1.0 \qquad (5)$$

where r3 is a curvature radius of an object side surface of the second lens and r4 is a curvature radius of an image side surface of the second lens.

5. The image pickup lens of claim 2 which satisfies a following conditional expression:

$$0.1 < (r1+r2)/(r1-r2) < 1.0 \qquad (6)$$

where r1 is a curvature radius of an object side surface of the first lens and r2 is a curvature radius of an image side surface of the first lens.

6. The image pickup lens of claim 2, wherein the fourth lens comprises a positive lens.

7. The image pickup lens of claim 2, wherein the fourth lens comprises a negative lens.

8. The image pickup lens of claim 1 further comprising an aperture stop between the first lens and the second lens.

9. The image pickup lens of claim 8, wherein the first lens has a shape having a convex surface which faces an object side of the optical pickup lens.

10. The image pickup lens of claim 8 which satisfies a following conditional expression:

$$-1.5 < f2/f < -0.7 \qquad (7)$$

where f2 is a focal length of the second lens and f is a focal length of a total system of the image pickup lens.

11. The image pickup lens of claim 8, wherein the first and second lenses have meniscus shapes such that the aperture stop is arranged between the first lens and the second lens and the concave surfaces of the first lens and the second lens face the aperture stop.

12. The image pickup lens of claim 8 which satisfies a following conditional expression:

$$-2.5 < (r3+r4)/(r3-r4) < -1.2 \qquad (8).$$

13. The image pickup lens of claim 8, wherein the fourth lens is a negative lens.

14. The image pickup lens of claim 1, wherein an air lens formed by an image side surface of the third lens and an object side surface of the fourth lens has a biconcave shape.

15. The image pickup lens of claim 1 which satisfies following conditional expressions:

$$0.30 < fa/f < 0.60 \qquad (9)$$

$$0.30 < f7/f < 2.0 \qquad (10)$$

where f is a focal length of an entire system of the image pickup lens,
    fa is a focal length of an air lens which is formed by an image side surface of the third lens and an object side surface of the fourth lens and satisfies the following expression:

$$fa = R6 \times R7/\{R7 \times (1-N3) + R6 \times (N4-1) - D6 \times (1-N3) \times (N4-1)\},$$

N3 is a refractive index of the third lens for d-line,
    N4 is a refractive index of the fourth lens for d-line,
    R6 is a curvature radius of an image side surface of the third lens,
    R7 is a curvature radius of an object side surface of the fourth lens,
    D6 is an air distance between the third lens and the fourth lens along an optical axis and
    r7 is a curvature radius of an object side surface of the fourth lens.

16. The image pickup lens of claim 15 which satisfies a following conditional expression:

$$0.30 < r7/f < 1.0 \qquad (11).$$

17. The image pickup lens of claim 1,
    wherein the first lens comprises a glass material,
    the second lens, the third lens and the fourth lens comprise a plastic material and
    the image pickup lens satisfies a following conditional expression:

$$|f/f234| < 0.5 \qquad (12)$$

where f is a focal length of an entire system of the image pickup lens and f234 is a composite focal length of the second lens, the third lens and fourth lens which comprise a plastic material.

18. The image pickup device comprising the image pickup lens of claim 1 and a solid-state image pickup element.

* * * * *